(12) United States Patent
Parnaby

(10) Patent No.: US 12,535,418 B2
(45) Date of Patent: Jan. 27, 2026

(54) AMPLITUDE MODULATION FOR ACCELERATED BASE CALLING

(71) Applicant: Illumina, Inc., San Diego, CA (US)

(72) Inventor: Gavin Parnaby, Laguna Niguel, CA (US)

(73) Assignee: ILLUMINA, INC., San Diego, CA (US)

( * ) Notice: Subject to any disclaimer, the term of this patent is extended or adjusted under 35 U.S.C. 154(b) by 736 days.

(21) Appl. No.: 17/823,036

(22) Filed: Aug. 29, 2022

(65) Prior Publication Data

US 2023/0101253 A1 Mar. 30, 2023

Related U.S. Application Data

(60) Provisional application No. 63/260,838, filed on Sep. 1, 2021.

(51) Int. Cl.
| | | |
|---|---|---|
| *G01N 21/64* | (2006.01) | |
| *B01J 19/00* | (2006.01) | |
| *C12Q 1/6869* | (2018.01) | |

(52) U.S. Cl.
CPC ...... *G01N 21/6428* (2013.01); *B01J 19/0046* (2013.01); *C12Q 1/6869* (2013.01);
(Continued)

(58) Field of Classification Search
CPC .............. B25B 27/0028; F01L 1/047; F01L 2001/0476; F01L 2800/09; F01L 2810/02;
(Continued)

(56) References Cited

U.S. PATENT DOCUMENTS

| | | |
|---|---|---|
| 5,432,272 A | 7/1995 | Benner |
| 6,150,510 A | 11/2000 | Seela et al. |
| | (Continued) | |

FOREIGN PATENT DOCUMENTS

| | | |
|---|---|---|
| WO | WO 92/02258 | 2/1992 |
| WO | WO 93/10820 | 6/1993 |
| | (Continued) | |

OTHER PUBLICATIONS

Illumina Inc., Dec. 31, 2018, Illumina CMOS chip and one-channel SBS chemistry, https://www.illumina.com/content/dam/illumina-marketing/documents/products/techspolights/cmos-tech-note-770-2013-054.pdf, 4 pp.
(Continued)

*Primary Examiner* — Jennifer Wecker
*Assistant Examiner* — Jonathan Bortoli
(74) *Attorney, Agent, or Firm* — Knobbe, Martens, Olson & Bear, LLP

(57) ABSTRACT

The disclosed technology relates to systems and methods for nucleic acid sequencing utilizing a single light source and a single detector. The disclosed technology may use the light source to stimulate a fluorescence emission from a polynucleotide and identify a nucleobase in the polynucleotide based on the intensity of the fluorescence emission received by the detector. The disclosed technology may utilize four types of nucleotide analogs which emit light at four distinguishable levels when excited by the light source. In various embodiments, the four types of nucleotide analogs may be coupled to different fluorophores or the same fluorophore with different probabilities or copy numbers.

19 Claims, 9 Drawing Sheets

(52) U.S. Cl.
CPC ............... *G01N 2021/6421* (2013.01); *G01N 2021/6441* (2013.01)

(58) Field of Classification Search
CPC . F16J 15/3268; B01J 19/0046; C12Q 1/6869; C12Q 2525/117; C12Q 2563/107; C12Q 2565/619; G01N 2021/6421; G01N 2021/6441; G01N 21/6428
See application file for complete search history.

(56) References Cited

U.S. PATENT DOCUMENTS

| | | | |
|---|---|---|---|
| 6,172,218 | B1 | 1/2001 | Brenner |
| 6,306,597 | B1 | 10/2001 | Macevicz |
| 6,329,178 | B1 | 12/2001 | Patel et al. |
| 6,395,524 | B2 | 5/2002 | Loeb et al. |
| 6,602,695 | B2 | 8/2003 | Patel et al. |
| 6,969,488 | B2 | 11/2005 | Bridgham et al. |
| 7,057,026 | B2 | 6/2006 | Barnes et al. |
| 7,589,315 | B2 | 9/2009 | Feng et al. |
| 7,601,499 | B2 | 10/2009 | Berka et al. |
| 8,392,126 | B2 | 3/2013 | Mann |
| 8,951,781 | B2 | 2/2015 | Reed et al. |
| 9,193,996 | B2 | 11/2015 | Buermann et al. |
| 10,697,009 | B2 | 6/2020 | Hayden et al. |
| 10,738,299 | B2 | 8/2020 | Steelman et al. |
| 2005/0100900 | A1 | 5/2005 | Kawashima et al. |
| 2006/0188901 | A1 | 8/2006 | Barnes et al. |
| 2006/0240439 | A1 | 10/2006 | Smith et al. |
| 2006/0281109 | A1 | 12/2006 | Barr et al. |
| 2007/0048748 | A1 | 3/2007 | Williams et al. |
| 2007/0166705 | A1 | 7/2007 | Milton et al. |
| 2012/0020537 | A1 | 1/2012 | Garcia et al. |
| 2012/0053063 | A1 | 3/2012 | Rigatti et al. |
| 2016/0083718 | A1 | 3/2016 | Wiener |
| 2017/0299518 | A1* | 10/2017 | Rothberg ........... G01N 21/6408 |
| 2018/0094140 | A1 | 4/2018 | Romanov |
| 2018/0195953 | A1 | 7/2018 | Langlois et al. |
| 2020/0080142 | A1 | 3/2020 | Langlois et al. |
| 2020/0102609 | A1 | 4/2020 | Glezer et al. |
| 2020/0277670 | A1 | 9/2020 | Romanov et al. |
| 2022/0033900 | A1 | 2/2022 | Romanov et al. |
| 2022/0195517 | A1 | 6/2022 | Cressia et al. |

FOREIGN PATENT DOCUMENTS

| | | |
|---|---|---|
| WO | WO 94/22892 | 10/1994 |
| WO | WO 94/24144 | 10/1994 |
| WO | WO 05/065814 | 7/2005 |
| WO | WO 06/064199 | 6/2006 |
| WO | WO 07/010251 | 1/2007 |
| WO | WO 09/091847 | 7/2009 |
| WO | WO 17/051201 | 3/2017 |
| WO | WO 20/097607 | 5/2020 |
| WO | WO 20/112964 | 6/2020 |
| WO | WO 21/050106 | 3/2021 |

OTHER PUBLICATIONS

Bentley et al., Nov. 6, 2008, Accurate whole human genome sequencing using reversible terminator chemistry, Nature, 456:53-59 and supplementary information.

Korlach et al., 2008, Selective aluminum passivation for targeted immobilization of single DNA polymerase molecules in zero-mode waveguide nano structures. Proc. Natl. Acad. Sci. USA 105:1176-1181.

Kozarewa et al., Apr. 2009, Amplification-free Illumina sequencing-library preparation facilitates improved mapping and assembly of (G+C)-biased genomes, Nature Methods 6(4):291-295.

Levene et al., Jan. 31, 2003, Zero-mode waveguides for single-molecule analysis at high concentrations. Science 299:682-686.

Lundquist et al., May 1, 2008, Parallel confocal detection of single molecules in real time, Opt. Lett. 33:1026-1028.

Sambrook et al., 2001, Molecular Cloning, A Laboratory Manual, 3rd Ed, Cold Spring Harbor Laboratory Press, Cold Spring Harbor Laboratory Press, NY.

Singer, 1989, UV spectral characteristics and acidic dissociation constants of 280 alkyl bases, nucleosides, and nucleotides, in Fasman ed., Practical Handbook of Biochemistry and Molecular Biology, CRC Press, Boca Raton, FL, pp. 385-394.

International Search Report and Written Opinion dated Dec. 6, 2022 in application No. PCT/US2022/041238.

* cited by examiner

| Label scheme 1 | 0%A ☆ / 100%A | 33%G ☆ / 67%G | 66%T ☆ / 34%T | 100%C ☆ / 0%C |
|---|---|---|---|---|
| Label scheme 2 | A | ☆ / G | △ / T | ♡ / C |
| Image 1 | ○ | ◐ | ◐ | ● |
| Result | A | G | T | C |

FIG. 3

One Color scatterplot

AMPLITUDE MODULATION FOR ACCELERATED BASE CALLING

CROSS-REFERENCE TO RELATED APPLICATIONS

This application claims priority to U.S. Provisional Application No. 63/260,838, filed Sep. 1, 2021, the content of which is incorporated by reference in its entirety.

BACKGROUND

In some types of next-generation sequencing technologies, DNA clusters are created on a flowcell following amplification of a target polynucleotide. Existing DNA sequencing systems and methods, e.g., existing sequencing platforms using two or four-channel sequencing chemistry, may utilize two or more excitation light sources to excite deoxyribonucleic acid analogs conjugated with fluorescent labels in a target polynucleotide, and two or more detectors to capture fluorescent images in two or more optical channels. Reducing the number of excitation light sources and/or the number of detectors may increase the sequencing speed of such systems. In addition, reducing the number of excitation light sources and exposure time may reduce unnecessary exposure of the samples to light, thus reducing light-induced DNA damage.

SUMMARY

The disclosed technology relates to the field of nucleic acid sequencing, and more particularly, to systems and methods for nucleic acid sequencing utilizing a single light source and a single detector.

In some aspects, the disclosed technology relates to systems and methods for identifying a nucleobase in a polynucleotide bound to a substrate. The disclosed system may include a first detector configured to detect the intensity of light within a first range of detection wavelengths. The disclosed system may further include a first light source configured to output light at a first excitation wavelength. The disclosed system may further include a processor configured to control the first light source to generate light at the first excitation wavelength to stimulate an emission from the polynucleotide bound to the substrate, and to identify a nucleobase in the polynucleotide based on the intensity of the emission received by the first detector. For example, a first nucleobase is identified based on receiving a full intensity emission by the first detector and a second nucleobase is identified by receiving an emission that is less than the full intensity emission. In some embodiments, at least four types of nucleobases can be identified from images captured by the first detector. In various embodiments, the disclosed system may utilize four types of nucleotide analogs which emit light at four distinguishable levels when excited by the light source, and the four types of nucleotide analogs may be coupled to different fluorophores or the same fluorophore with different probabilities or copy numbers.

In some embodiments, the disclosed system may further include a second detector configured to detect light within a second range of detection wavelengths and/or a second light source configured to output light at a second excitation wavelength. The processor may be further configured to control the second light source to generate light at the second excitation wavelength to stimulate an emission from the polynucleotide and/or identify a nucleobase in the polynucleotide based on the intensity of the emission received by the first detector and by the second detector. In some embodiments, the processor is further configured to determine a quality of identifying the nucleobase and/or an error rate of identifying the nucleobase and/or a signal-to-noise ratio of emissions from a plurality of polynucleotides bound to the substrate. In response to the determined quality and/or the determined error rate and/or the determined signal-to-noise ratio, the processor may actuate the second detector, the second light source, or both, and/or may switch from a first mode of identifying a nucleobase based on the intensity of the emission received by the first detector to a second mode of identifying a nucleobase based on the intensity of the emission received by the first detector and by the second detector. In some embodiments, the processor may actuate the second detector, the second light source, or both, and/or may switch from a first mode of identifying a nucleobase based on the intensity of the emission received by the first detector to a second mode of identifying a nucleobase based on the intensity of the emission received by the first detector and by the second detector, after a predetermined number of cycles of identifying nucleobases in the polynucleotide. In some embodiments, the processor is further configured to control the fluidic device to deliver an alternative set of nucleotide analogs (e.g., as part of an alternative sequencing reaction mix) to the polynucleotide, based on a determined quality of identifying the nucleobase, based on a determined error rate of identifying the nucleobase, based on a determined signal-to-noise ratio, or after a predetermined number of cycles of identifying nucleobases.

The systems, devices, kits, and methods disclosed herein each have several aspects, no single one of which is solely responsible for their desirable attributes. Numerous other embodiments are also contemplated, including embodiments that have fewer, additional, and/or different components, steps, features, objects, benefits, and advantages. The components, aspects, and steps may also be arranged and ordered differently. After considering this discussion, and particularly after reading the section entitled "Detailed Description", one will understand how the features of the devices and methods disclosed herein provide advantages over other known devices and methods.

It is to be understood that any features of the systems disclosed herein may be combined together in any desirable manner and/or configuration. Further, it is to be understood that any features of the methods disclosed herein may be combined together in any desirable manner. Moreover, it is to be understood that any combination of features of the methods and/or the systems may be used together, and/or may be combined with any of the examples disclosed herein. It should be appreciated that all combinations of the foregoing concepts and additional concepts discussed in greater detail below are contemplated as being part of the inventive subject matter disclosed herein and may be used to achieve the benefits and advantages described herein.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 shows two example dye labeling schemes according to embodiments of the disclosed sequencing technology.

DETAILED DESCRIPTION

Figure 1A:
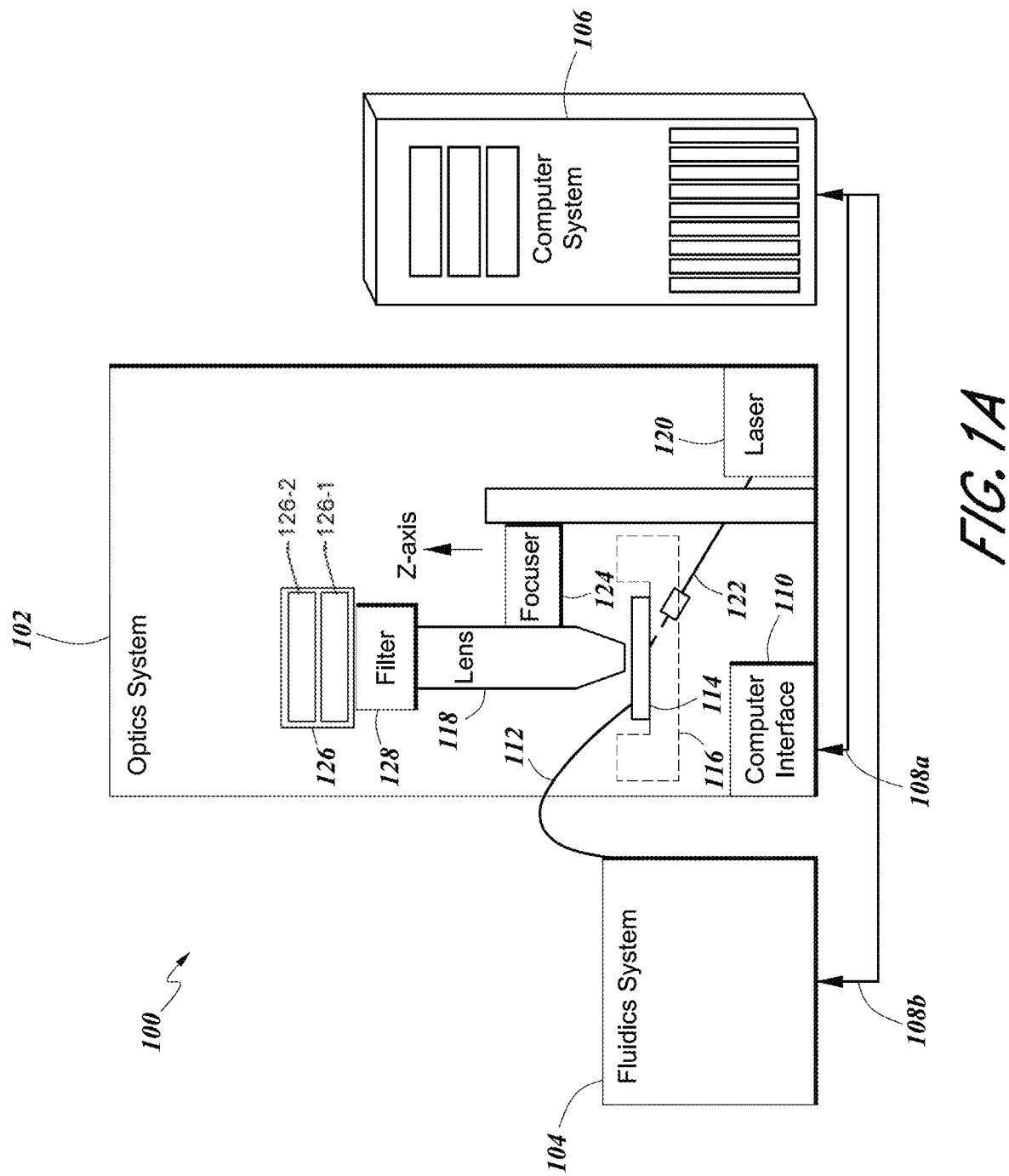
FIG. 1A schematically illustrates an example sequencing system which can perform embodiments of the disclosed sequencing technology.

All patents, patent applications, and other publications, including all sequences disclosed within these references, referred to herein are expressly incorporated herein by reference, to the same extent as if each individual publication, patent or patent application was specifically and individually indicated to be incorporated by reference. All documents cited are, in relevant part, incorporated herein by reference in their entireties for the purposes indicated by the context of their citation herein. However, the citation of any document is not to be construed as an admission that it is prior art with respect to the present disclosure.

Introduction

Embodiments of the disclosed technology relate to next-generation sequencing systems and methods that can identify four nucleotide bases using a single excitation light source and a single optical channel for detection. The disclosed sequencing technology can make use of a sequencing-by-synthesis process. During each sequencing cycle, four types of nucleotide analogs can be incorporated onto growing primers hybridized to polynucleotides being sequenced. The four types of nucleotide analogs may be coupled to different fluorophores, or to the same type of fluorophore, but with different fluorescent emission intensities. The same type of fluorophore may also be attached to the four types of nucleotide analogs, but attached to the analogs at different percentages of the total nucleotide population in the reaction mix. For example, for A, only 25% of the A nucleotides in the population of A nucleotides would be labeled with the fluorophore. For G, only 50% of the G nucleotides in the population of G nucleotides would be labeled with the fluorophore. For example, for C, 75% of the C nucleotides in the population of G nucleotides would be labeled with the fluorophore. For T, 100% of the T nucleotides would be labeled with the fluorophore. In each of the above scenarios, the four types of nucleotide analogs may emit light at four distinguishable emission levels or intensities when excited by the light source. The nucleobases in the polynucleotides may then be identified based on the distinguishable levels, or intensities, of the fluorescence emissions.

The disclosed technology may be viewed as a coding mechanism using amplitude modulation of the emission wavelength in a "one-color" system, where each base is encoded as having a different intensity in a single optical channel. For example, G may be encoded as OFF, T may be encoded as ⅓ amplitude, C may be encoded as ⅔ amplitude, and A may be encoded as full amplitude. In some embodiments, the single-color, single-image sequencing approach may be implemented by using different dyes having different fluorescence intensities, but the same emission wavelength, for the different base-type. In some embodiments, the single-color, single-image sequencing approach may be implemented by altering the ratio of fluorescently tagged versus untagged nucleotide analogs for each nucleotide base-type. Improvements in real-time sequence analysis processes, such as adaptive equalization, adaptive updates, time-tracking, de-offset estimation, gain estimation, per-cluster channel-estimation and per-cluster phasing correction, improve signal-to-noise ratio for each DNA cluster and allow more accurate tracking of DNA cluster amplitude, and thus can facilitate the implementation of this "one-color" encoding scheme. It should be realized that particularly during the early cycles of a read, the SNR is comparatively high because phasing and other issues have not started to degrade the SNR of the system. The approach described herein may also be particularly applicable in situations where the read length is generally relatively short, such as for RNA reads. Ensuring a high enough signal-to-noise ratio may allow the "one-color" system to control or maintain an acceptable basecalling error rate during long sequence read applications.

In a way, basecalling can be interpreted as a communications system that uses fluorescent intensity modulation to emit different intensity levels for each labeled nucleotide and then directly detect those intensity levels. Basecalling essentially detects a signal corrupted by noise, where the signal intensity is modulated by the amount of fluorescent emission to reflect the base, and where the noise may come from intensity variations such as from laser intensity variation, phasing, shot noise, cluster intensity variation, etc. Raw intensity measurement at a given cycle may be used to represent a symbol. When signaling rate is limited and the signal-to-noise ratio is high, communications systems may employ advanced modulation techniques that trade signal-to-noise ratio for throughput, thus reducing the symbol rate. The disclosed "one-color" (or may be referred to as "pulse amplitude modulation 4" or "PAM4") system which can encode more bits per symbol and use higher signal-to-noise ratio to transmit more information in each cycle. In this sense, 4 amplitude levels are encoded per symbol and thus a symbol is equivalent to 2 bits. The disclosed "one-color" system can double the information per imaging cycle, thus halving the number of images taken and halving the imaging time required. The primary analysis computing requirements may also be reduced by up to 50% using this system. In some embodiments, the disclosed "one-color" system may be implemented by altering the decision logic in the existing real-time sequence analysis process; but the equalization, phasing, and parameter estimation processes may stay the same, and no extra computing or storage cost may be required. Furthermore this approach may reduce the amount of time a particular sample is exposed to the laser, thereby reducing laser damage and increasing potential read-lengths.

The disclosed "one-color" sequencing technology adds a new design dimension that can be used to trade signal-to-noise ratio for throughput and instrument design complexity/cost. For example, the disclosed technology may trade signal-to-noise ratio for imaging time. The disclosed technology may halve the imaging time for specific applications or may double the throughput at the same imaging rate. The disclosed technology may reduce instrument cost of goods sold and/or system intensity expense. The disclosed technology may be well suited for short read applications with cost sensitivities. The disclosed technology may obtain signal-to-noise ratio gains from improvements in real-time analysis processes (e.g., in the equalization or per-cluster parameter estimation processes). The disclosed technology may allow reduction of imaging time and thus more time available for the sequencing chemistry to act upon the polynucleotides being sequenced. The disclosed technology may allow better instrument intensity control, simplified optics, and higher signal intensity. The disclosed technology may apply knowledge of noise shape to better identify the bases, for example, Poisson shaped counting noise may be used to adjust signaling levels accordingly. The disclosed technology may be expanded to encode 5 or 6 different nucleobases as different levels of signal. The disclosed "one-color" sequencing technology allows base calling from a single image taken in a single optical channel for each sequencing cycle. The disclosed sequencing technology allows reducing average signal intensity, reducing signal-to-noise ratio, simplifying laser requirements, simplifying optical filter sets, fewer components and lower cost of a sequencing instrument, reducing sequencing time, reducing data storage requirements and memory size, and reducing computation requirements as a result of fewer images to be processed.

Example Sequencer

In FIG. 1A, an example sequencing system 100 which can perform the disclosed sequencing technology is illustrated. The sequencing system 100 can be configured to utilize disclosed sequencing methods based on a single optical excitation and a single detection channel. Non-limiting examples of the sequencing reactions utilized can include variations of sequencing-by-synthesis processes, such as those used in Illumina® dye sequencing or HeliScope® single molecule sequencing.

The sequencing system 100 can include an optics system 102 configured to generate raw sequencing data using sequencing reagents supplied by a fluidics system 104 that is part of the sequencing system 100. The raw sequencing data can include fluorescent images captured by the optics system 102. The sequencing system 100 can further include a computer system 106 that can be configured to control the optics system 102 and the fluidics system 104 via communication channels 108a and 108b. For example, a computer interface 110 of the optics system 102 can be configured to communicate with the computer system 106 through the communication channel 108a.

During sequencing reactions, the fluidics system 104 can direct the flow of reagents through one or more reagent tubes 112 to and from a flowcell 114 positioned on a mounting stage 116. The reagents can include, for example, fluorescently labeled nucleotides, buffers, enzymes, and cleavage reagents. The flowcell 114 can include at least one fluidic channel. The flowcell 114 can be a patterned array flowcell or a random array flowcell. The flowcell 114 can include multiple clusters of single-stranded polynucleotides to be sequenced in the at least one fluidic channel. The lengths of the polynucleotides can vary ranging, for example, from about 50 bases, 100 bases, 150 bases, 200 bases, 300 bases, 500 bases, to about 1000 bases. The polynucleotides can be attached to one or more fluidic channels of the flowcell 114. In some embodiments, the flowcell 114 can include a plurality of wells, wherein each well can include multiple copies of a target polynucleotide to be sequenced. The mounting stage 116 can be configured to allow proper alignment and movement of the flowcell 114 in relation to the other components of the optics system 102. In one embodiment, the mounting stage 116 can be used to align the flowcell 114 with a lens 118.

The optics system 102 can include a single light source 120, such as a single laser or a single LED, configured to generate light having wavelengths narrowly distributed at around a predetermined wavelength, for example 455 nm. In some embodiments, the predetermined wavelength is within the range of 405 nm-460 nm. However, embodiments are not limited to any particular wavelength of light. The light source only needs to be configured to generate the correct wavelength of light which excites the fluorescent labels attached to the nucleotides on the flowcell.

The light generated by the light source 120 can pass through a fiber optic cable 122 to excite fluorescent labels in the flowcell 114. The lens 118, mounted on a focuser 124, can move along the z-axis. The focused fluorescent emissions can be detected by a detector 126, for example a charge-coupled device (CCD) sensor or a complementary metal oxide semiconductor (CMOS) sensor. In some embodiments, nucleotide incorporations can be detected with zeromode waveguides as described, for example, in Levene et al. Science 299, 682-686 (2003); Lundquist et al. Opt. Lett. 33, 1026-1028 (2008); and Korlach et al. Proc. Natl. Acad. Sci. USA 105, 1176-1181 (2008), the disclosures of which are incorporated herein by reference in their entireties.

A filter assembly 128 of the optics system 102 can be configured to filter the fluorescent emissions from the fluorescent labels in the flowcell 114. The filter assembly 128 can include a plurality of optical filters, where a correct filter can be selected depending on the particular fluorophores used in a sequencing reaction. In one alternate embodiment, the computer system 106 may automatically determine which optical filter should be used for a sequencing reaction, e.g., by scanning labels and/or barcodes attached to a sample vial and determining the particular fluorophores to be used in a sequencing reaction based on the labels and/or barcodes, or by retrieving information stored in the memory relating to previous sequencing reactions, and then control the filter assembly 128 to select and use the desired optical filter. The selected filter can be a longpass filter, a shortpass filter, a bandstop filter, or a bandpass filter, depending on the types of fluorescent molecules being used in the system. For example, the selected filter can be a bandpass filter selected to match the peak of the emission spectrum of a particular fluorescent label.

In some embodiments, the detector 126 includes one sub-detector while the filters of the filter assembly 128 may be mechanically switched or rotated in front of the sub-detector, such that differently filtered images can be taken by the sub-detector sequentially. In some embodiments, the detector 126 includes one sub-detector and the filter assembly 128 may include at least one layer of switchable material which has a light transmittance that is variable upon application of a stimulus, where the stimulus may be light, electricity, temperature, or any combination thereof. As a result, the filter assembly 128 can provide a plurality of optical filters such that differently filtered images can be taken by the sub-detector sequentially. In some embodiments, the detector 126 includes one sub-detector and the filter assembly 128 may include one or more switchable filters base on the micro-electromechanical system technology, such that differently filtered images can be taken by the sub-detector sequentially.

In some embodiments, the detector 126 can include two or more sub-detectors 126-1 and 126-2 to be selected depending on the set of fluorophores used, for example a first detector coupled with a first filter and a second detector coupled with a second filter. In some embodiments, the optics system 102 may include two or more dichroic mirrors/beamsplitters configured to split the fluorescent emissions, such that after splitting the fluorescent emissions with the dichroic mirrors, the detector 126 can take two differently filtered images simultaneously (or close in time) using the two sub-detectors 126-1 and 126-2 coupled with two different filters. In some embodiments, the detector 126 can include two or more sub-detectors stacked along the incoming direction of the fluorescent emissions. Different wavelengths of the fluorescent emissions may differentially decay or be differentially absorbed along the incoming direction, such that sub-detectors 126-1 and 126-2 at different positions along the incoming direction can be selected depending on the set of fluorophores used, or be configured to take differently filtered images simultaneously (or close in time).

In use, a sample having a polynucleotide to be sequenced may be loaded into the flowcell 114 and placed in the mounting stage 116. The computer system 106 may then activate the fluidics system 104 to begin a sequencing cycle. During sequencing reactions, the computer system 106 may instruct the fluidics system 104, through the communication interface 108*b*, to supply reagents, for example labeled nucleotide analogs, to the flowcell 114. Through the communication interface 108*a* and the computer interface 110, the computer system 106 may control the light source 120 of the optics system 102 to generate light at around a predetermined wavelength and excite nucleotide analogs incorporated into growing primers hybridized to the polynucleotide being sequenced, for example. The computer system 106 may control the detector 126 of the optics system 102 to capture images of the diffraction-limited spots of DNA clusters having the fluorescently labeled nucleotide analogs. The computer system 106 can receive the fluorescent images from the detector 126 and process the fluorescent images received to determine the nucleotide sequence of the polynucleotide being sequenced.

Figure 1B:
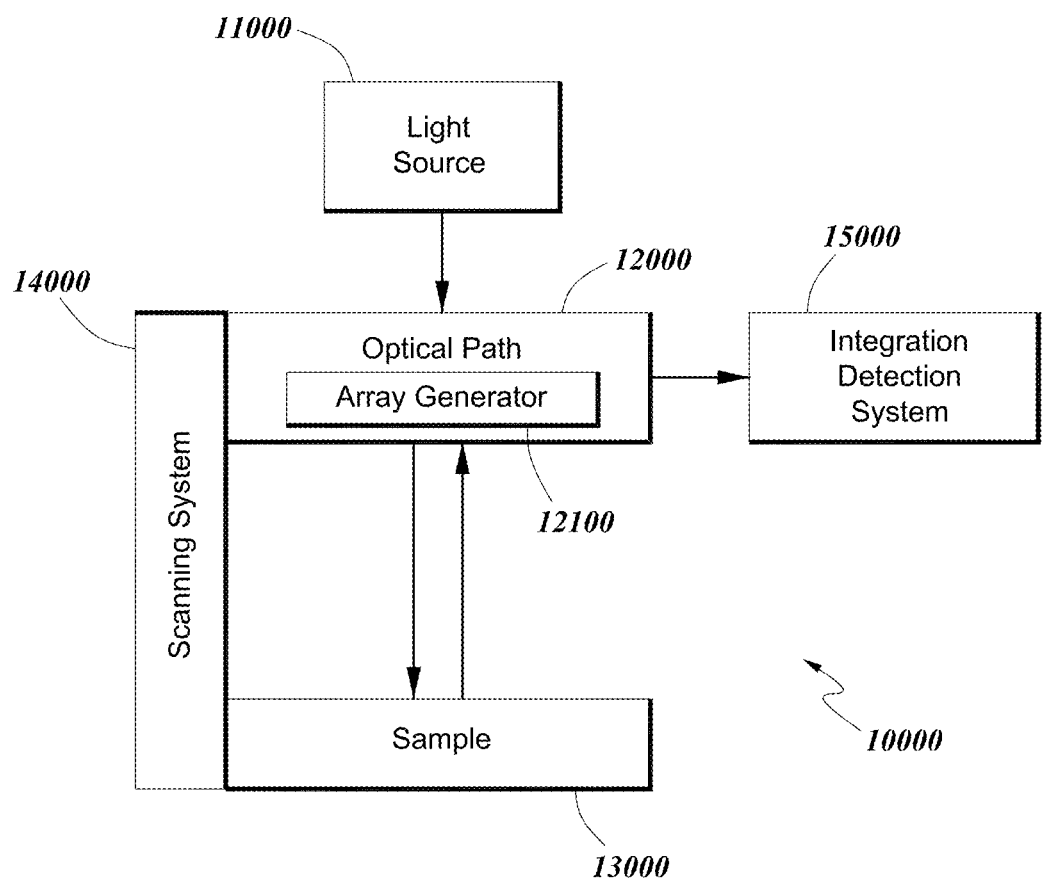
FIG. 1B schematically illustrates an example imaging system to be used in embodiments of the disclosed sequencing technology.

In FIG. 1B, an example of an imaging system 10000 to be used in the disclosed sequencing technology is illustrated. For example, the imaging system 10000 may be used in the example sequencing system 100 illustrated in FIG. 1A. The imaging system 10000 may include a light source 11000 that can provide light to excite fluorophores at targeted points on a sample. The light source 11000 can include one or more lasers, light-emitting diodes, or other optical sources, such that the light source 11000 can provide a variety of wavelengths of light. In some embodiments, the light source 11000 can be configured to selectively provide light with a predetermined range of wavelengths that are tuned to the set of fluorophores being used. In some embodiments, the light source 11000 can be configured to output light at an optical frequency corresponding to a wavelength in a predefined range of wavelengths of light. In some embodiments, a user of the disclosed sequencing systems may choose a specific optical frequency to be output from the light source 11000, depending on the particular fluorophores used in a sequencing reaction. In one alternate embodiment, the computer system 106 may automatically determine which optical frequency should be output from the light source 11000, e.g., by scanning labels and/or barcodes attached to a sample vial and determining the particular fluorophores to be used in a sequencing reaction based on the labels and/or barcodes, or by retrieving information stored in the memory relating to previous sequencing reactions, and then control the light source 11000 to select and output the desired optical frequency.

The imaging system 10000 may include an optical path 12000 from the light source 11000 to the sample 13000, e.g., a microfluidic device including one or more flow chambers where one or more sequencing reactions occur. In some embodiments, the optical path 12000 can include a combination of one or more of mirrors, lenses, prisms, quarter wave plates, half wave plates, polarizers, filters, dichroic mirrors, beam splitters, beam combiners, objective lenses, wide field optics configured to spread light from a light source over a relatively large region of a sample, etc. The optical path 12000 can be configured to direct light from the light source 11000 to the sample 13000. In addition, the optical path 12000 may include optical components which can be configured to direct light emitted from the sample 13000 to an integration detection system 15000. In some embodiments, a portion of the optical elements that are used to direct light from the light source 11000 to the sample 13000 are also used to direct light from the sample 13000 to the integration detection system 15000. Further examples of optical paths and optical systems may be found in U.S. Pat. Nos. 7,589,315, 8,951,781, or U.S. Pat. No. 9,193,996, each of which is incorporated by reference herein in its entirety.

The imaging system 10000 may include a scanning system 14000 to effectively move light relative to the sample 13000 to scan the sample to generate an image. In some embodiments, the scanning system 14000 can be implemented within the optical path 12000. For example, the scanning system 14000 can include one or more scanning mirrors that move relative to one another within the optical path 12000 to effectively move the light from the light source 11000 across the sample. In some embodiments, the scanning system 14000 can be implemented as a mechanical system that physically moves the sample 13000 so that the sample moves relative to the light from the light source 11000. In some embodiment, the scanning system 14000 can be a combination of optical components in the optical path 12000 and a mechanical system for physically moving the sample 13000 so that the light from the light source 11000 and the sample 13000 move relative to one another.

The imaging system 10000 may include an integration detection system 15000 that includes one or more light detectors as well as associated electronic circuitry, processors, data storage, memory, and the like to acquire and process image data of the sample 13000. In some embodiments, the integration detection system 15000 can include photomultiplier tubes, avalanche photodiodes, image sensors (e.g., CCDs, CMOS sensors, etc.), and the like. In some embodiments, the light detectors of the integration detection system 15000 can include components to amplify light signals and may be sensitive to single photons. In some embodiments, the light detectors of the integration detection system 15000 can have a plurality of channels or pixels. The integration detection system 15000 can acquire one or more images based on the light detected from the sample 13000.

In some embodiments, the optical path 12000 may include an array generator 12100 that can generate a plurality of light exposure regions on the sample 13000. In some embodiments, the array generator 12100 can generate a certain light exposure pattern on the sample 13000. These light exposure regions can be scanned over the sample 13000 using the scanning system 14000 to selectively illuminate areas of the sample 13000 for imaging. The integration detection system 15000 can integrate signals corresponding to particular points on the sample 13000 as the plurality of light exposure regions are scanned over the sample 13000. For example, for an individual point on the sample 13000, the integration detection system 1500 can selectively aggregate detected signals corresponding to the individual point where the individual point is illuminated at different times by different light exposure regions. In some embodiments, the combination of the array generator 12100 and the integration detection system 15000 can detect light simultaneously, or near-simultaneously, from a plurality of points on the sample 13000. In some embodiments, the combination of the array generator 12100 and the integration detection system 15000 can integrate the detected light from a plurality of points on the sample over time.

In some embodiments, a plurality of sequencing reactions may be run parallelly in a plurality of flow chambers of the sample 13000. For example, a plurality of sequencing reactions may be performed for a plurality of biological specimen. In some embodiments, the plurality of sequencing reactions may use different sets of fluorophores. In some embodiments, the light source 11000, the array generator 12100, and the scanning system 14000 can be configured to selectively illuminate different areas of the sample 13000 with different optical frequencies of light, depending on the different sets of fluorophores used for the sequencing reactions occurring in different areas of the sample 13000.

Figure 1C:
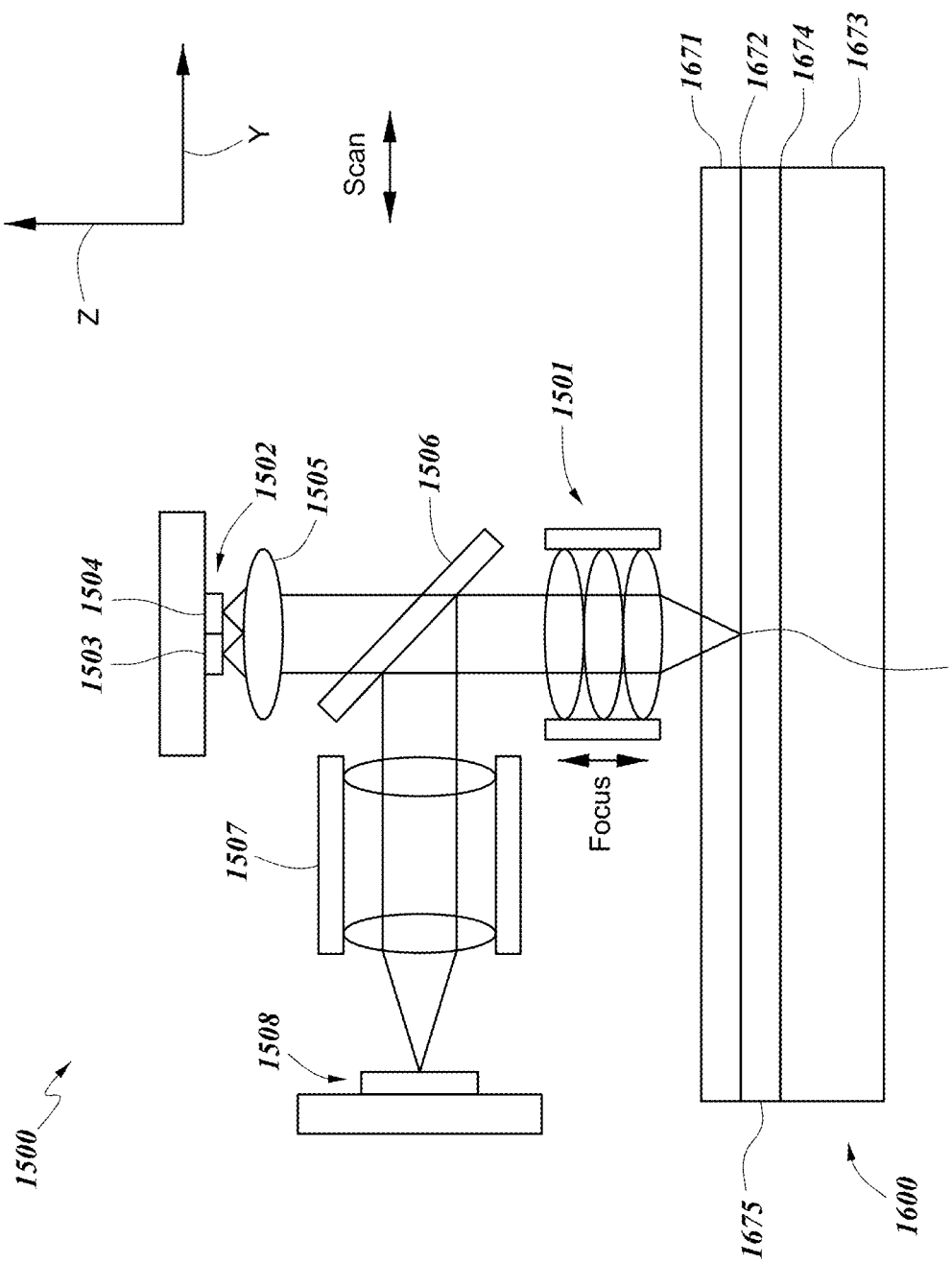
FIG. 1C schematically illustrates another example imaging system to be used in embodiments of the disclosed sequencing technology.

In FIG. 1C, another example of an imaging system 1500 to be used in the disclosed sequencing technology is illustrated. For example, the imaging system 1500 may be used in the example sequencing system 100 illustrated in FIG. 1A. The imaging system 1500 may be used to image a flowcell 1600 having an upper layer 1671 and a lower layer 1673 that may be separated by a fluid filled channel 1675. In the configuration shown, the upper layer 1671 may be optically transparent and light from the imaging system 1500 may be focused to an area 1676 on the inner surface 1672 of the upper layer 1671. In an alternative configuration, light from the imaging system 1500 can be focused on the inner surface 1674 of the lower layer 1673. One or both of the surfaces can include array features which contain polynucleotides and sequencing reactions that are to be detected by the imaging system 1500.

The imaging system 1500 may include an objective 1501 that is configured to direct excitation light from a light source 1502 to the flowcell 1600 and to direct emission from the flowcell 1600 to a detector 1508. In the exemplary layout, excitation light from the light source 1502 passes through a lens 1505, then through a beam splitter 1506, and then through the objective 1501 on its way to the flowcell 1600. In some embodiments, the light source 1502 may include one or more lasers, light-emitting diodes, or any combination thereof. For example, the light source 1502 may include one laser 1503 and one light emitting diode 1504, which can provide light at different wavelengths or ranges of wavelengths to be selected depending on the fluorophores used. In one alternate embodiment, the computer system 106 may automatically determine which wavelength or which range of wavelengths should be output from the light source 1502, e.g., by scanning labels and/or barcodes attached to a sample vial and determining the particular fluorophores used in a sequencing reaction based on the labels and/or barcodes, or by retrieving information stored in the memory relating to previous sequencing reactions, and then control the light source 1502 to select and output the desired wavelength or range of wavelengths.

The emission light from the flowcell 1600 may be captured by the objective 1501 and reflected by the beam splitter through the beam conditioning optics 1507 and to the detector 1508 (e.g., a CMOS sensor). The detector 1508 may be configured to detect fluorescence emission in a particular optical channel (e.g., a particular range of wavelengths), depending on the fluorophores used in a sequencing reaction. The beam splitter 1506 may direct the emission light in a direction that is orthogonal to the path of the excitation light. The position of the objective 1501 can be moved in the z dimension to alter the focus of the excitation light on the flowcell 1600. The imaging system 1500 can be moved back and forth in the y direction to capture images of several areas of the flowcell 1600.

Figure 2:
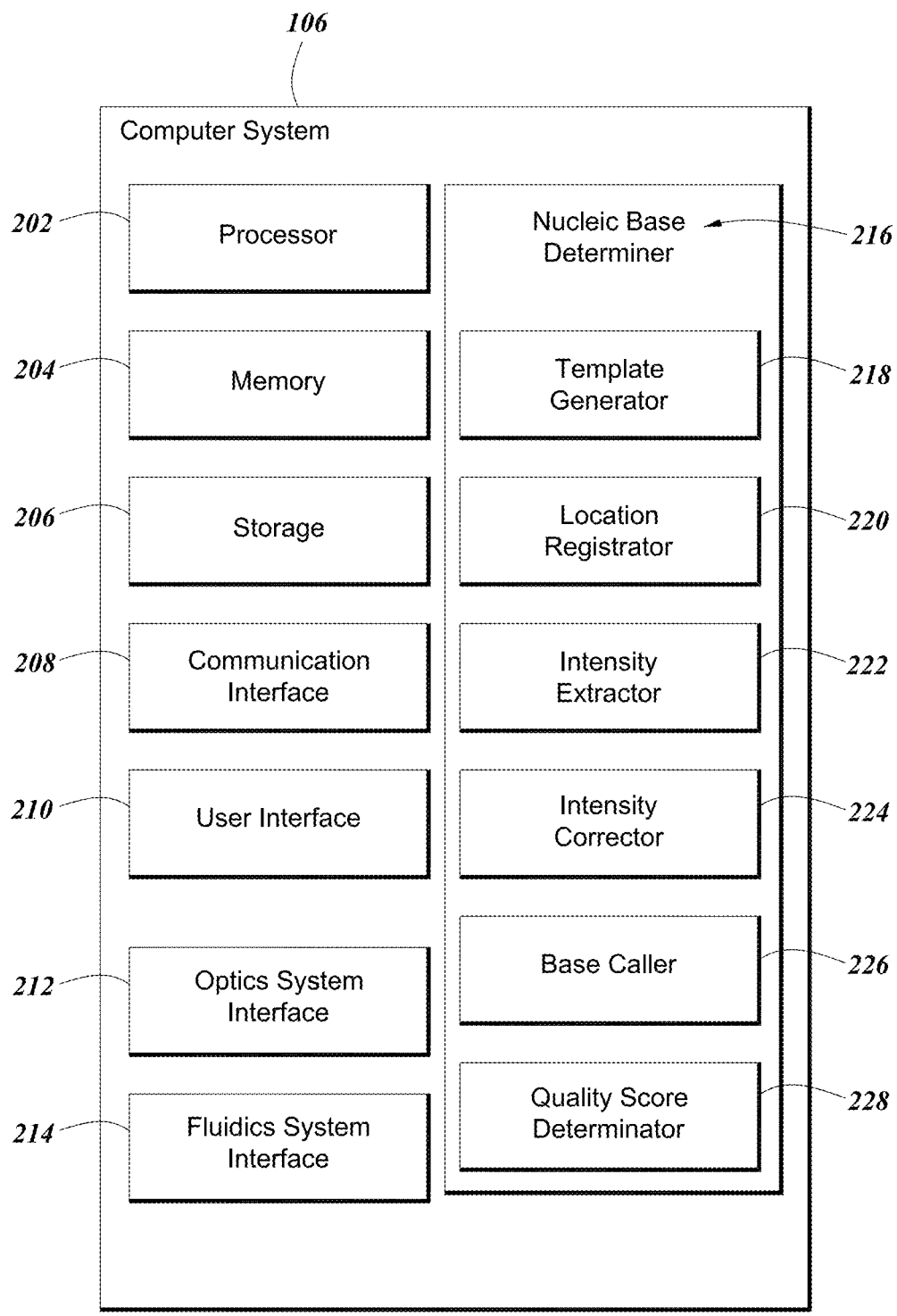
FIG. 2 shows a functional block diagram of an example computer system to be used in the sequencing system as shown in FIG. 1A.

The computer system 106 of the example sequencing system 100 illustrated in FIG. 1A can be configured to control the optics system 102 and the fluidics system 104. While many configurations are possible for the computer system 106, one embodiment is illustrated in FIG. 2. As shown in FIG. 2, the computer system 106 can include a processor 202 that is in electrical communication with a memory 204, a storage 206, and a communication interface 208.

The processor 202 can be configured to execute instructions that cause the fluidics system 104 to supply reagents to the flowcell 114 during sequencing reactions. The processor 202 can execute instructions that control the light source 120 of the optics system 102 to generate light at around a predetermined wavelength. The processor 202 can execute instructions that control the detector 126 of the optics system 102 and receive data from the detector 126. The processor 202 can execute instructions to process data, for example fluorescent images, received from the detector 126 and to determine the nucleotide sequences of polynucleotides based on the data received form the detector 126. The memory 204 can be configured to store instructions for configuring the processor 202 to perform the functions of the computer system 106 when the sequencing system 100 is powered on. When the sequencing system 100 is powered off, the storage 206 can store the instructions for configuring the processor 202 to perform the functions of the computer system 106. The communication interface 208 can be configured to facilitate the communications between the computer system 106, the optics system 102, and the fluidics system 104.

The computer system 106 can include a user interface 210 configured to communicate with a display device (not shown) for displaying the sequencing results of the sequencing system 100. The user interface 210 can be configured to receive inputs from users of the sequencing system 100. An optics system interface 212 and a fluidics system interface 214 of the computer system 106 can be configured to control the optics system 102 and the fluidics system 104 through the communication links 108a and 108b illustrated in FIG. 1A. For example, the optics system interface 212 can communicate with the computer interface 110 of the optics system 102 through the communication link 108a.

The computer system 106 can include a nucleic base determiner 216 configured to determine the nucleotide sequence of polynucleotides using the data received from the detector 126. The nucleic base determiner 216 can include one or more of: a template generator 218, a location registrator 220, an intensity extractor 222, an intensity corrector 224, a base caller 226, and a quality score determiner 228. The template generator 218 can be configured to generate a template of the locations of polynucleotide clusters in the flowcell 114 using the fluorescent images captured by the detector 126. The location registrator 220 can be configured to register the locations of polynucleotide clusters in the flowcell 114 in the fluorescent images captured by the detector 126 based on the location template generated by the template generator 218. The intensity extractor 222 can be configured to extract intensities of the fluorescent emissions from the fluorescent images to generate extracted intensities. For example, the peak intensity value found in a diffraction-limited spot of a DNA cluster may be extracted from the image and used to represent the signal of the DNA cluster. For another example, the total intensity included within a diffraction-limited spot of a DNA cluster may be extracted from the image and used to represent the signal of the DNA cluster. Alternatively, the intensity estimate can be made through the use of equalization and channel estimation.

The intensity corrector 224 can be configured to reduce or eliminate noise or aberration inherent in the sequencing reaction or optical system. For example, intensity may be influenced by laser intensity fluctuation, DNA cluster shape/size variation, uneven illumination, optical distortions or aberrations, and/or phasing/pre-phasing that occur in the DNA clusters. In some embodiments, the intensity corrector 224 can phase correct or pre-phase correct extracted intensities. The base caller 226 can be configured to determine the nucleobases of a polynucleotide from the corrected intensities. The bases of a polynucleotide determined by the base caller 226 can be associated with quality scores determined by the quality score determiner 228. Quality scoring refers to the process of assigning a quality score to each base call. To evaluate the quality of a base call from a sequencing read, example processes can include calculating a set of predictor values for the base call and using the predictor values to look up a quality score in a quality table. The quality score can be presented in any suitable format that allows a user to determine the probability of error of any given base call. In some embodiments, the quality score is presented as a numerical value. For example, the quality score can be quoted as QXX where the XX is the score and it means that that particular call has a probability of error of $10^{-XX/10}$. Thus, as an example, Q30 equates to an error rate of 1 in 1000, or 0.1% and Q40 equates to an error rate of 1 in 10,000 or 0.01%. The error rate can be calculated using a control nucleic acid. Additionally, some metrics displays can include the error rate on a per-cycle basis. In some embodiments, the quality table is generated using on a calibration data set, the calibration set being representative of run and sequence variability. Further details of the computations that can be performed by the nucleic base determiner, calculation of error rate and quality score may be found in U.S. Pat. No. 8,392,126, U.S. Patent Application Publication Numbers 2020/0080142 and 2012/0020537, each of which is incorporated by reference herein in its entirety.

Sequencing with a Single Optical Channel

The disclosed technology may use a sequencing-by-synthesis process. During each sequencing cycle, four types of nucleotide analogs can be added and incorporated onto the growing primer-polynucleotides. The four types of nucleotide analogs can have different modifications. For example, three types of nucleotide analogs may be labeled with fluorescent dyes and the fourth type of nucleotide analog may be unlabeled. In some embodiments, coupling of the dyes to nucleotides may not result in significant changes to their absorption or emission spectra. After the incorporation of nucleotide analogs, any unincorporated nucleotide analogs can be washed and removed. Subsequently, the polynucleotides may be stimulated by an excitation light, and fluorescent images may be taken to determine the identities of the nucleotide analogs based on their fluorescence emissions.

FIG. 3 and FIG. 4 illustrate the working principles of the disclosed sequencing technology. FIG. 3 shows two example dye labeling schemes according to some embodiments of the disclosed sequencing technology. In "Label scheme 1", different types of nucleotide analogs are labeled by the same fluorescent label but with different percentages of labeled nucleotides for each analog type. The labeled percentage may be about 0, 10, 20, 30, 40, 50, 60, 70, 80, 90 and 100%, or any value therebetween. For example, 100% of dATP is unlabeled and 0% of dATP is labeled with a dye, 67% of dGTP is unlabeled and 33% of dGTP is labeled with the same dye, 34% of dTTP is unlabeled and 66% of dTTP is labeled with the dye, and 0% of dCTP is unlabeled and 100% of dCTP is labeled with the dye. In "Label scheme 2", different types of nucleotide analogs are labeled by different fluorescent labels having different absorption and/or emission spectra. For example, dATP is unlabeled, dGTP is labeled with a first dye, dTTP is labeled with a second dye, and dCTP is labeled with a third dye. In yet another label scheme, different types of nucleotide analogs are labeled by the same fluorescent label but with different numbers of copies of each fluorescent molecule on each nucleotide. The copy numbers may be 1, 2, 3, 4, 5, 6, 7, 8, 9, 10, between 10 and 15, or between 15 and 20. For example, dATP is unlabeled, dGTP is labeled with 1 copy of a dye, dTTP is labeled with 2 copies of the same dye, and dCTP is labeled with 4 copies of the same dye. In general, the aforementioned label schemes may be combined, such that a first type of nucleotide is labeled with a first copy number of a first dye at a first percentage, a second type of nucleotide is labeled with a second copy number of a second dye at a second percentage, a third type of nucleotide is labeled with a third copy number of a third dye at a third percentage, and a fourth type of nucleotide is labeled with a fourth copy number of a fourth dye at a fourth percentage, and that the different types of nucleotides may produce distinct levels of fluorescence emissions.

In some embodiments, coupling of the dyes to nucleotides may not result in significant changes to their absorption or emission spectra. In some embodiments, a single light source, such as a "blue" laser, can excite the fluorescent labels at a predetermined wavelength, such as about 450 nm. However, embodiments are not limited to light sources generating this particular wavelength of light, and other wavelengths corresponding to red, green, violet or other available wavelengths of light are contemplated. In various embodiments, the output optical frequency of the single light source may or may not be tunable. Detection of the dNTPs can include capturing their fluorescent emissions by taking a fluorescent image ("Image 1" in FIG. 3) with a detector tuned to the predetermined optical channel. In some embodiments, the fluorescent images can be stored for later processing offline. In some embodiments, the fluorescent images can be processed to determine the sequence of the growing primer-polynucleotides in each cluster in real time. Three types of nucleotide analogs may be identified by their distinct detected emission level (e.g., intensity). The fourth type of nucleotide analog may be identified as having a low signal intensity (e.g., substantially close to background level) received by the detector. For example, dATP may be identified as having a close to zero brightness level, dCTP may be identified as having the full brightness level, dGTP may be identified as having a quarter of the full brightness, and dTTP may be identified as having half of the full brightness. In other embodiments, dATP may be identified as having a close to zero brightness level, dCTP may be identified as having the full brightness level, dGTP may be identified as having a third of the full brightness, and dTTP may be identified as having two-thirds of the full brightness.

Figure 4A:
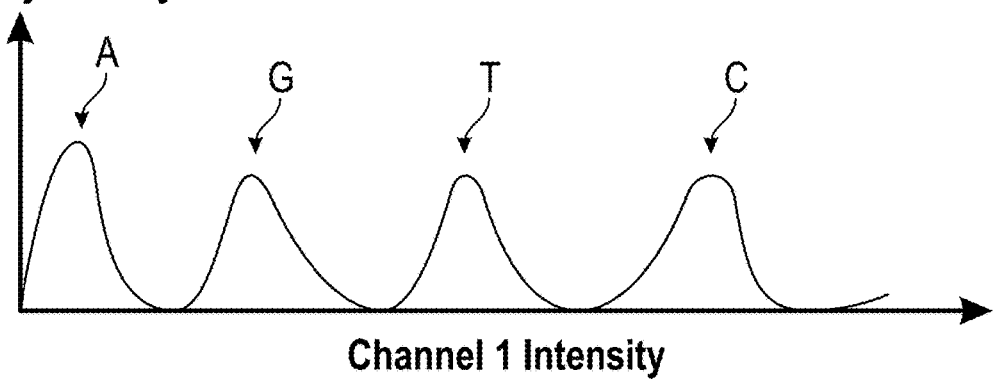
FIG. 4A is a line graph showing expected fluorescence detection results from a prophetic experiment performed according to one embodiment of the disclosed sequencing technology.
Figure 4B:
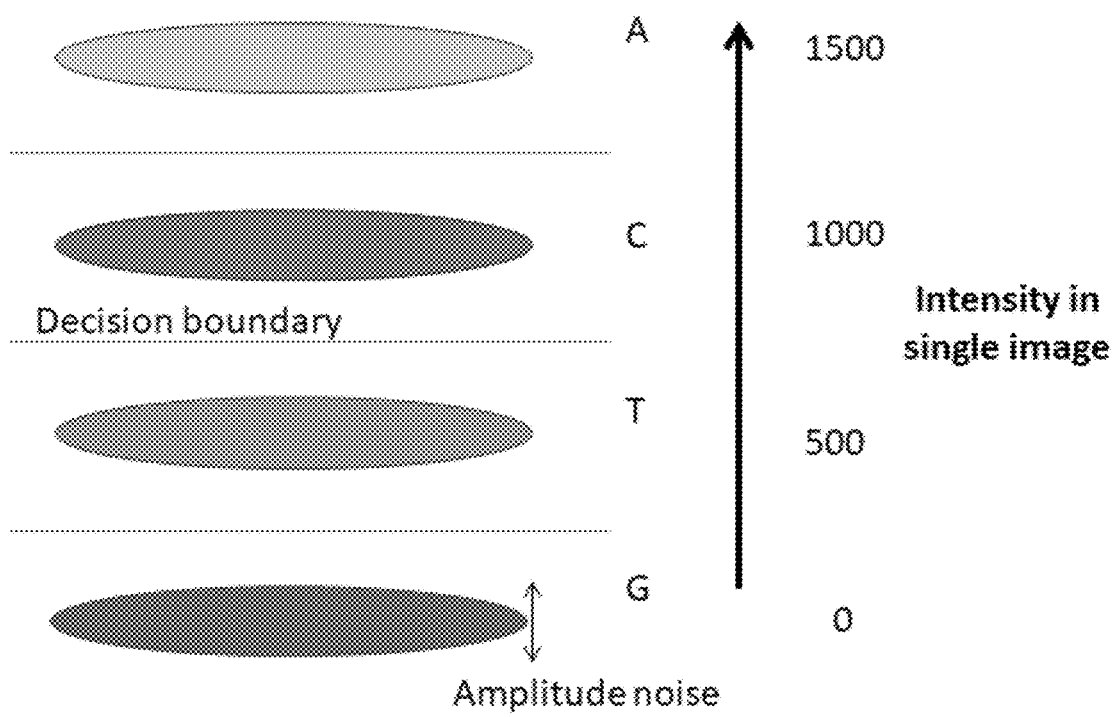
FIG. 4B is a scatterplot showing expected fluorescence detection clouds resulting from a prophetic experiment performed according to one embodiment of the disclosed sequencing technology.

FIG. 4A is a line graph showing expected fluorescence detection results that may result from an analysis performed according to one embodiment of the disclosed sequencing technology. FIG. 4B is a scatter plot showing similar expected fluorescence detection results of detecting the intensities of four nucleotides from a similar image. In these prophetic exemplary embodiments, dATP produces a close to zero brightness level, dCTP produces a full brightness level, dGTP produces roughly one-third of the full brightness, and dTTP produces roughly two-third of the full brightness. However, the detected signal levels of the DNA clusters may be influenced by various sources of noise, such as laser intensity fluctuation over time, DNA cluster shape/size variation, uneven illumination of the excitation light on the sample tile, optical distortions or aberrations in the optical paths, shot noise, and/or phasing/pre-phasing that occur in the DNA clusters. Therefore, the collection of detected DNA cluster signal intensities on a sample tile shows a distribution instead of four discrete intensity levels.

Moreover, the distribution may change over the sequencing cycles, for example, variance of the distribution may increase over the sequencing cycles due to phasing/pre-phasing. The four peaks of the distribution may be identified as the expected signal levels that can be base-called as the four types of nucleotides. The distribution may be fit to statistical models, for example the distribution may be decomposed into four Gaussians, and the signal-to-noise ratio of each Gaussian may be estimated as the expected value over the standard deviation. The signal-to-noise ratio of the plurality of DNA clusters on the sample tile may be defined as a function (e.g., a weighted average, a geometric mean, etc.) of the signal-to-noise ratios of the four Gaussians. Over the sequencing cycles, the expected values and/or the standard deviations of the Gaussians may change, and the change in the signal-to-noise ratio may be determined accordingly.

Figure 5:
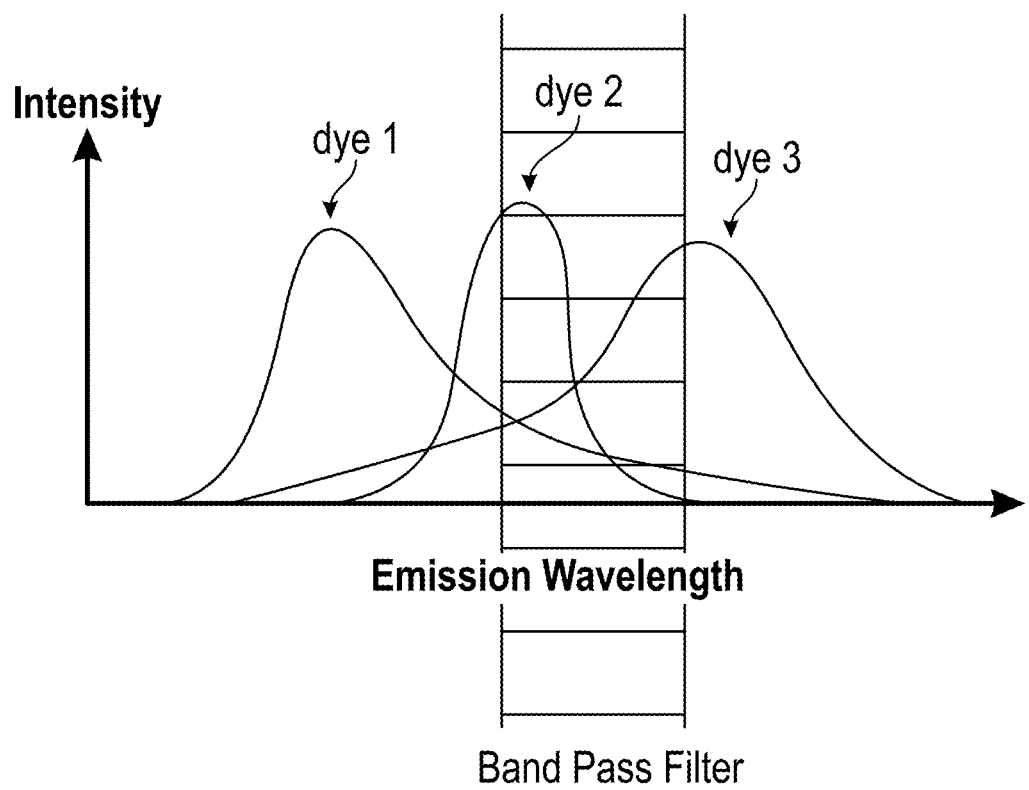
FIG. 5 shows example emission spectra of a collection of nucleotide analogs used in a dye labeling scheme according to one embodiment of the disclosed technology.

FIG. 5 shows an example emission spectra of a collection of nucleotide analogs according to the dye "Label scheme 2" in FIG. 3, where dATP is unlabeled, dGTP is labeled with a "dye 1", dTTP is labeled with a "dye 2", and dCTP is labeled with a "dye 3". The dyes have different fluorescence emission spectra. Therefore, by properly selecting a bandpass filter having the transmission window as shown in FIG. 5, the different emission spectra curves will enclose different areas within the transmission window, and thus a detector using the bandpass filter will detect dye 1 with a first brightness level, dye 2 with a second brightness level, and dye 3 with a third brightness level, where the brightness levels are distinct. For example, the fully-functionalized dGTP (ffG) is labeled with a first dye which has an emission spectrum curve having a peak at about 500 nm when excited by a 450 nm light source; the fully-functionalized dTTP (ffT) is labeled with a second dye which has an emission spectrum curve having a peak at about 540 nm when excited by a 450 nm light source; the fully-functionalized dCTP (ffC) is labeled with a third dye which has an emission spectrum curve having a peak at about 580 nm when excited by a 450 nm light source; and dATP is not labeled. In an embodiment, the transmission window of the bandpass filter may be 530 nm-570 nm, such that ffC is brighter than ffT, and ffT is brighter than ffG. In some embodiments, one of the three fluorescent dyes can be a normal Stokes shift dye. As used herein, a normal Stokes shift dye refers to a dye having a Stokes shift between 55 to 95 nm, or including Stokes shifts of about 55, 60, 70, 80, 90, 95 nm, or any value therebetween. One of the three fluorescent dyes can be a short Stokes shift dye. As used herein, a short Stokes shift dye refers to a dye having a Stokes shift of about 5, 10, 20, 30, 40, 50 nm, or any value therebetween. One of the three fluorescent dyes can be a long Stokes shift dye. As used herein, a long Stokes shift dye refers to a dye having a Stokes shift of about 100, 110, 120, 130, 140, 150, 160, 170, 180, 190, 200 nm, or any value therebetween.

In some embodiments, a disclosed system for identifying a nucleobase in a polynucleotide bound to a substrate may include: a first detector configured to detect the intensity of light within a first range of detection wavelengths; a first light source configured to output light at a first excitation wavelength; and a processor configured to control the first light source to generate light at the first excitation wavelength to stimulate an emission from the polynucleotide bound to the substrate, and to identify a nucleobase in the polynucleotide based on the intensity of the emission received by the first detector. In some embodiments, a first nucleobase is identified based on receiving a full intensity emission by the first detector and a second nucleobase is identified by receiving an emission that is less than the full intensity emission. In some embodiments, at least four types of nucleobases can be identified from images captured by the first detector alone. In some embodiments, the four types of nucleobases are selected from the group consisting of adenine (A), aminoadenine (Z), cytosine (C), guanine (G), thymine (T), and uracil (U). In some embodiments, the substrate comprises a plurality of chemically functionalized regions, a plurality of cavities, a plurality of optical resonators, a plurality of optical waveguides, or any combination thereof.

Figure 6:
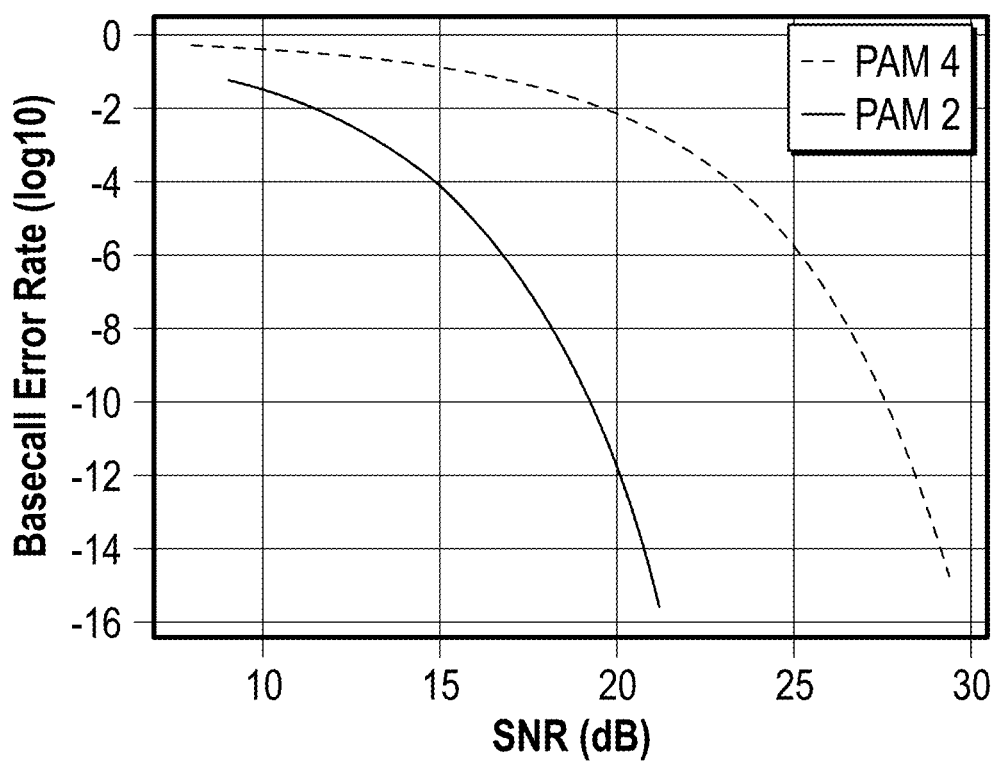
FIG. 6 is a line graph showing signal-to-noise ratio requirements to support the disclosed sequencing technology versus a prior art two-channel sequencing technology.

FIG. 6 is a line graph showing signal-to-noise ratio requirements to support the disclosed sequencing technology ("PAM4") versus a prior art two-channel sequencing technology ("PAM2"). The disclosed PAM4 or single-optical channel sequencing system only requires half as many images, but would require a higher signal-to-noise ratio to achieve the same level of base-call error rate. FIG. 6. illustrates that PAM4 signaling may require a higher Signal to Noise Ratio (SNR) to support the same base error rate as PAM2 signaling. In the early part of a sequencing process, the sequencing system may have excess SNR which can be used to satisfy target error rate requirements using the disclosed PAM4 encoding and thereby enabling a single cycle base-calling process as described. In the present sequencing system the maximum intensity may be limited by fluorophore intensity and fluorescent molecule attachment rates to each nucleotide. Therefore, the peak PAM2 signal intensity may be the same as the peak PAM4 signal.

However, in the PAM4 system, two intermediate levels are introduced, thus encoding more information in each cycle. The distance between signaling levels is smaller in PAM4, resulting in more SNR being useful for distinguishing between the intensities of each fluorescently labeled base.

Figure 7:
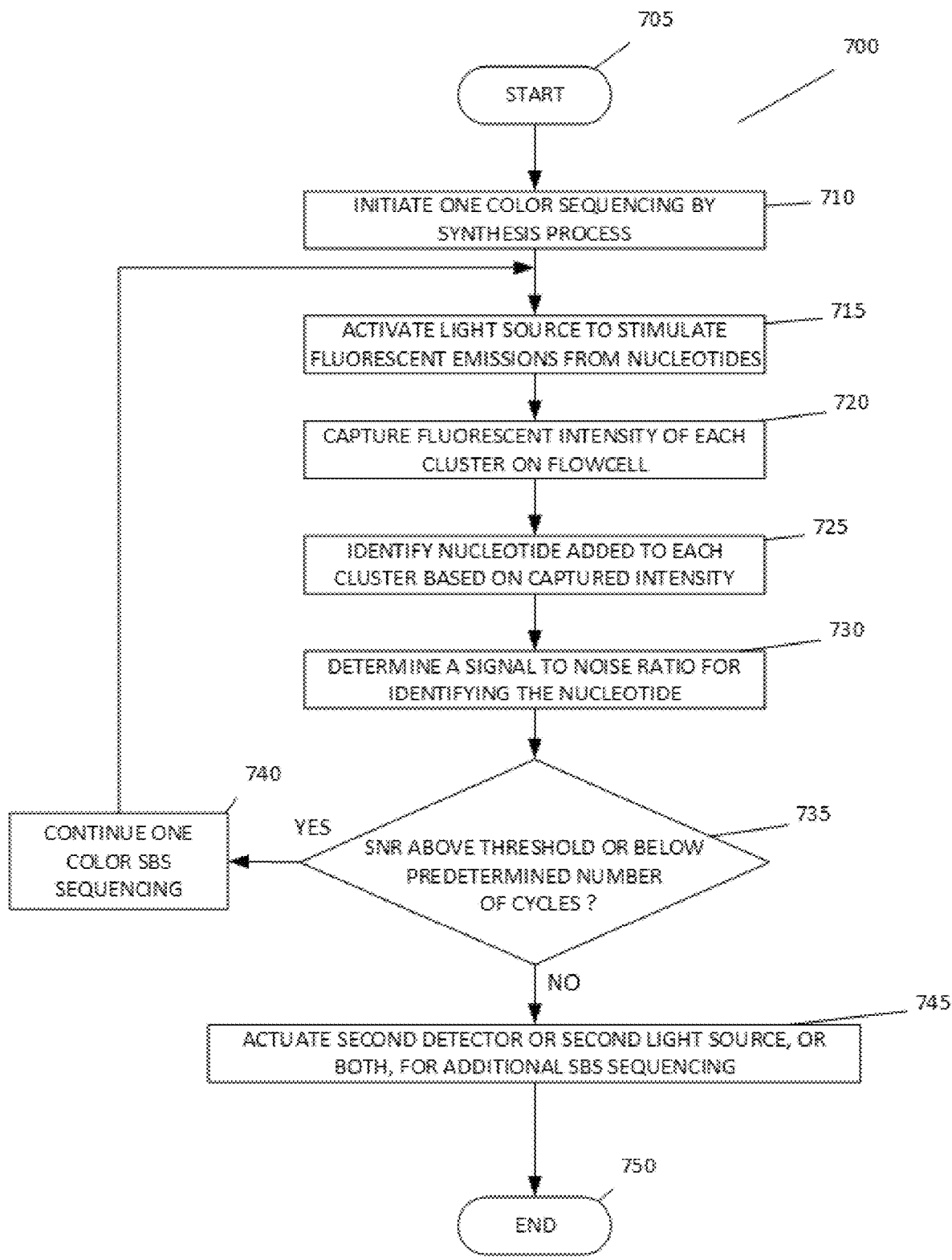
FIG. 7 is a flow diagram showing one embodiment of a method for sequencing a polynucleotide according to one embodiment.

In view of the potential degradation of signal-to-noise ratio over the sequencing cycles, and in view of the higher signal-to-noise ratio requirement to support the single-optical channel sequencing technology, in some embodiments, the disclosed system may be configured to switch from single-optical channel sequencing mode ("PAM4") to a two-optical channel sequencing mode ("PAM2") as shown in the flow chart of FIG. 7.

As shown in FIG. 7, a sequencing by synthesis process 700 begins at a start state 705 and then moves to a state 710 wherein a one color SBS process, using one excitation light and one detector, as described herein is initiated on a sequencing system. The process 700 then moves to a state 715 wherein a light source, such as a laser or LED, is activated to stimulate fluorescent emissions from the labeled nucleotides in the SBS system. The process 700 then moves to a state 720 wherein the fluorescent emissions from each cluster within the SBS system are captured by a detector. For example, a CMOS camera may be used to capture an image of the colonies within a flow cell and capture the fluorescent intensity of each cluster.

The process 700 then moves to a state 725 wherein the nucleotide being added to the growing nucleotide sequence strands within each cluster is identified based on the captured fluorescent intensity at each cluster. As described herein, each of the four different nucleotides may be labeled with the same fluorescent molecule and identified based on the intensity of the fluorescent image captured following excitation by the light source. The process 700 then moves to a state 730, wherein the SNR of the system for identifying the nucleotides is calculated, as described above, to determine a SNR level for the current sequencing cycle of the system. The process 700 then moves to a decision state 735 wherein a determination is made whether the SNR is above a particular threshold, or the system has already reached a predetermined number of sequencing cycles. If the process 700 makes a determination that the SNR is above a predetermined threshold, or below a predetermined number of sequencing cycles, then the process moves to a state 740 to continue the one color SBS sequencing process. However, if a determination is made at the decision state 735 that the SNR is below a particular threshold, or that a predetermined number of sequencing cycles has passed, then the process 700 moves to a state 745 where a secondary sequencing process, which may be less efficient, but work well with a lower overall SNR, may be performed. For example, a second fluorescent detector may be used for subsequent SBS cycles. Alternatively, a second light source and/or the second detector may be used for subsequent SBS cycles. The process 700 may then continue to perform the alternative SBS processes until the SNR reaches back to a predetermined level, or may default to continue performing the alternative sequencing process until the run is complete.

As described above, in one embodiment, a second detector is used to detect light within a second range of detection wavelengths. A processor within the system may be configured to identify a nucleobase in the polynucleotide based on the intensity of the emission received by the first detector and by the second detector. For another example, the system may further include a second light source configured to output light at a second excitation wavelength, wherein the processor is further configured to control the second light source to generate light at the second excitation wavelength to stimulate an emission from the polynucleotide, and to identify a nucleobase in the polynucleotide based on the intensity of the emission received by the first detector. For yet another example, the system may further include: a second detector configured to detect light within a second range of detection wavelengths; and a second light source configured to output light at a second excitation wavelength, wherein the processor is further configured to control the second light source to generate light at the second excitation wavelength to stimulate an emission from the polynucleotide, and to identify a nucleobase in the polynucleotide based on the intensity of the emission received by the first detector and by the second detector.

In some embodiments, the first light source and/or the second light source comprises a laser or a light-emitting diode. In some embodiments, the first detector and/or the second detector comprises complementary metal-oxide-semiconductor image sensors, charge-coupled device image sensors, photomultiplier tubes, photodiodes, or any combination thereof. In some embodiments, the disclosed system further includes one or more optical filter materials, one or more diffraction gratings, one or more light dispersing elements, or any combination thereof.

In certain embodiments, the first range of detection wavelengths and the second range of detection wavelengths do not overlap. In some embodiments, the first excitation wavelength is shorter than all of the wavelengths in the first range of detection wavelengths, and/or the second excitation wavelength is shorter than all of the wavelengths in the second range of detection wavelengths. In some embodiments, the first excitation wavelength is within 405 nm-460 nm and/or the second excitation wavelength is within 405 nm-460 nm. In some embodiments, wherein the first excitation wavelength is longer than all of the wavelengths in the first range of detection wavelengths, and/or the second excitation wavelength is longer than all of the wavelengths in the second range of detection wavelengths. In some embodiments, the first excitation wavelength is within 700 nm-1400 nm and/or the second excitation wavelength is within 700 nm-1400 nm.

To switch the sequencing mode, in some embodiments, the processor is further configured to: determine a quality of identifying the nucleobase; and in response to the determined quality, actuate the second detector, the second light source, or both. In other embodiments, the processor is further configured to: determine an error rate of identifying the nucleobase; and in response to the determined error rate, actuate the second detector, the second light source, or both, and switch from a first mode of identifying a nucleobase based on the intensity of the emission received by the first detector to a second mode of identifying a nucleobase based on the intensity of the emission received by the first detector and by the second detector. In alternative embodiments, herein the processor is further configured to: determine a signal-to-noise ratio of emissions from a plurality of polynucleotides bound to the substrate; and in response to the determined signal-to-noise ratio, actuate the second detector, the second light source, or both, and switch from a first mode of identifying a nucleobase based on the intensity of the emission received by the first detector to a second mode of identifying a nucleobase based on the intensity of the emission received by the first detector and by the second detector. In further embodiments, the processor is further configured to actuate the second detector, the second light source, or both, after a predetermined number of cycles of identifying nucleobases in the polynucleotide. In yet further embodiments, the processor is further configured to actuate the second detector, the second light source, or both, and switch from a first mode of identifying a nucleobase based on the intensity of the emission received by the first detector to a second mode of identifying a nucleobase based on the intensity of the emission received by the first detector and by the second detector, after a predetermined number of cycles of identifying nucleobases in the polynucleotide.

In some embodiments, the disclosed system further includes a fluidic device configured to deliver a set of nucleotide analogs to the polynucleotide, wherein the set of nucleotide analogs comprises: a first nucleotide analog coupled to a fluorophore with a first probability; a second nucleotide analog coupled to the fluorophore with a second probability; and a third nucleotide analog coupled to the fluorophore with a third probability. In some embodiments, the set of nucleotide analogs further comprises: a fourth nucleotide analog coupled to the fluorophore with a fourth probability, or a fourth nucleotide analog which does not couple to the fluorophore. To facilitate switching of the sequencing mode, in some embodiments, the processor is further configured to control the fluidic device to deliver an alternative set of nucleotide analogs to the polynucleotide, based on a determined quality of identifying the nucleobase, based on a determined error rate of identifying the nucleobase, based on a determined signal-to-noise ratio, or after a predetermined number of cycles of identifying nucleobases. The alternative set of nucleotide analogs is suitable for a two-optical channel sequencing process.

In some embodiments, the disclosed system further includes a fluidic device configured to deliver a set of nucleotide analogs to the polynucleotide, wherein the set of nucleotide analogs comprises: a first nucleotide analog coupled to a first number of a fluorophore; a second nucleotide analog coupled to a second number of the fluorophore; and a third nucleotide analog coupled to a third number of the fluorophore. In some embodiments, the set of nucleotide analogs further comprises: a fourth nucleotide analog coupled to a fourth number of the fluorophore, or a fourth nucleotide analog which does not couple to the fluorophore. To facilitate switching of the sequencing mode, in some embodiments, the processor is further configured to control the fluidic device to deliver an alternative set of nucleotide analogs to the polynucleotide, based on a determined quality of identifying the nucleobase, based on a determined error rate of identifying the nucleobase, based on a determined signal-to-noise ratio, or after a predetermined number of cycles of identifying nucleobases. The alternative set of nucleotide analogs is suitable for a two-optical channel sequencing process.

In some embodiments, the disclosed system further includes a fluidic device configured to deliver a set of nucleotide analogs to the polynucleotide, wherein the set of nucleotide analogs comprises: a first nucleotide analog coupled to a first fluorescent label; a second nucleotide analog coupled to a second fluorescent label; and a third nucleotide analog coupled to a third fluorescent label. In some embodiments, the set of nucleotide analogs further comprises: a fourth nucleotide analog coupled to a fourth fluorescent label, or a fourth nucleotide analog coupled to no fluorescent label. In some embodiments, the fluorescent labels have different fluorescence brightness and/or emission spectra. To facilitate switching of the sequencing mode, in some embodiments, the processor is further configured to control the fluidic device to deliver an alternative set of nucleotide analogs to the polynucleotide, based on a determined quality of identifying the nucleobase, based on a determined error rate of identifying the nucleobase, based on a determined signal-to-noise ratio, or after a predetermined number of cycles of identifying nucleobases. The alternative set of nucleotide analogs is suitable for a two-optical channel sequencing process.

In some embodiments, the disclosed system further includes a fluidic device configured to deliver a set of nucleotide analogs to the polynucleotide, wherein the set of nucleotide analogs comprises: a first nucleotide analog coupled to a first number of a first fluorescent label; a second nucleotide analog coupled to a second number of a second fluorescent label; and a third nucleotide analog coupled to a third number of a third fluorescent label. In some embodiments, the set of nucleotide analogs further comprises: a fourth nucleotide analog coupled to a fourth number of a fourth fluorescent label, or a fourth nucleotide analog coupled to no fluorescent label. In some embodiments, the fluorescent labels have different fluorescence brightness and/or emission spectra. To facilitate switching of the sequencing mode, in some embodiments, the processor is further configured to control the fluidic device to deliver an alternative set of nucleotide analogs to the polynucleotide, based on a determined quality of identifying the nucleobase, based on a determined error rate of identifying the nucleobase, based on a determined signal-to-noise ratio, or after a predetermined number of cycles of identifying nucleobases. The alternative set of nucleotide analogs is suitable for a two-optical channel sequencing process.

In some embodiments, the nucleotide analogs used in the disclosed sequencing system may be fully functionalized nucleotides. The linkers located between the nucleotide base and the fluorescent molecule may include one or more cleavage groups. Prior to the subsequent sequencing cycle, the fluorescent labels can be removed from the nucleotide analogs by cleavage of the linker. For example, a linker attaching a fluorescent label to a nucleotide analog can include an azide and/or an alkoxy group, for example on the same carbon, such that the linker may be cleaved after each incorporation cycle by a phosphine reagent, thereby releasing the fluorescent label. The nucleotide triphosphates can be reversibly blocked at the 3' position so that sequencing is controlled, and no more than a single nucleotide analog can be added onto each extending primer-polynucleotide in each cycle. For example, the 3' ribose position of a nucleotide analog can include both alkoxy and azido functionalities which can be removable by cleavage with a phosphine reagent, thereby creating a nucleotide that can be further extended. Prior to the subsequent sequencing cycle, the reversible 3' blocks can be removed so that another nucleotide analog can be added onto each extending primer-polynucleotide.

In some embodiments, the fluorescent labels are selected from the group consisting of polymethine derivatives, coumarin derivatives, benzopyran derivatives, chromenoquinoline derivatives, compounds containing bis-boron heterocycles such as BOPPY and BOPYPY. In some embodiments, the fluorescent label is attached to the nucleotide through a cleavable linker. In some further embodiments, the labeled nucleotide may have the fluorescent label attached to the C5 position of a pyrimidine base or the C7 position of a 7-deaza purine base, optionally through a cleavable linker moiety. For example, the nucleobase may be 7-deaza adenine and the dye is attached to the 7-deaza adenine at the C7 position, optionally through a cleavable linker. The nucleobase may be 7-deaza guanine and the dye is attached to the 7-deaza guanine at the C7 position, optionally through a cleavable linker. The nucleobase may be cytosine and the dye is attached to the cytosine at the C5 position, optionally through a cleavable linker. As another example, the nucleobase may be thymine or uracil and the dye is attached to the thymine or uracil at the C5 position, optionally through a cleavable linker. In some further embodiments, the cleavable linker may comprise similar or the same chemical moiety as the reversible terminator 3' hydroxy blocking group such that the 3' hydroxy blocking group and the cleavable linker may be removed under the same reaction condition or in a single chemical reaction. Non-limiting example of the cleavable linker include the LN3 linker, the sPA linker, and the AOL linker, each of which is exemplified below.

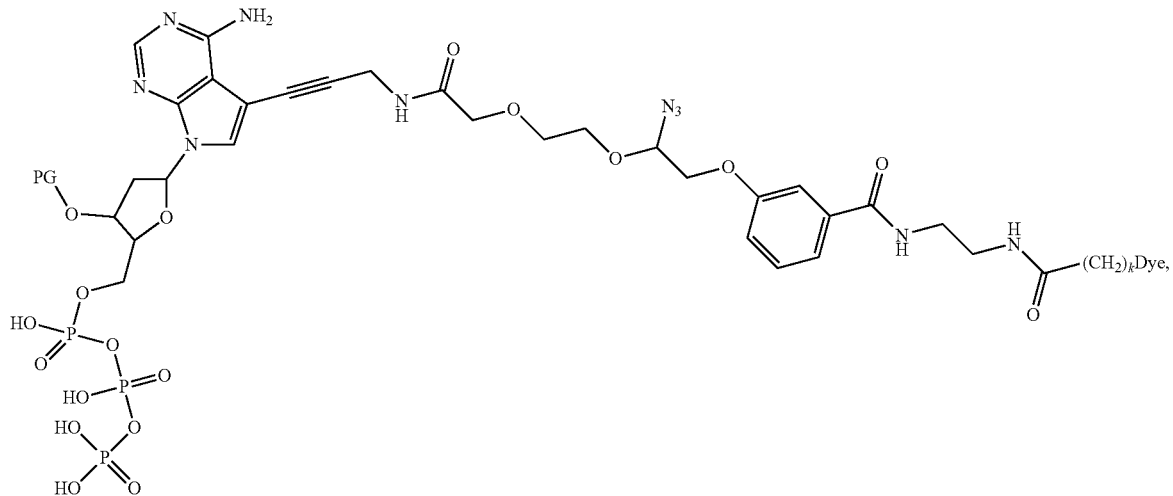

ffA-LN3-Dye

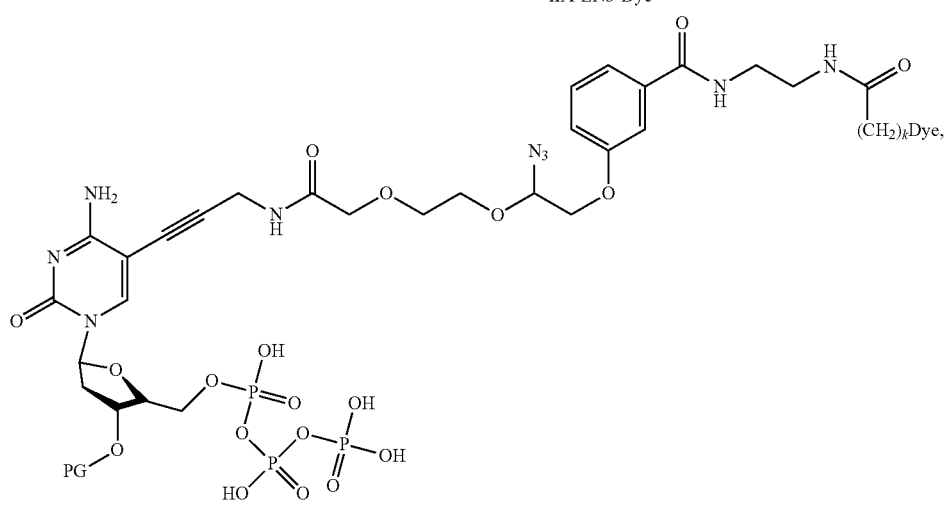

ffC-LN3-Dye

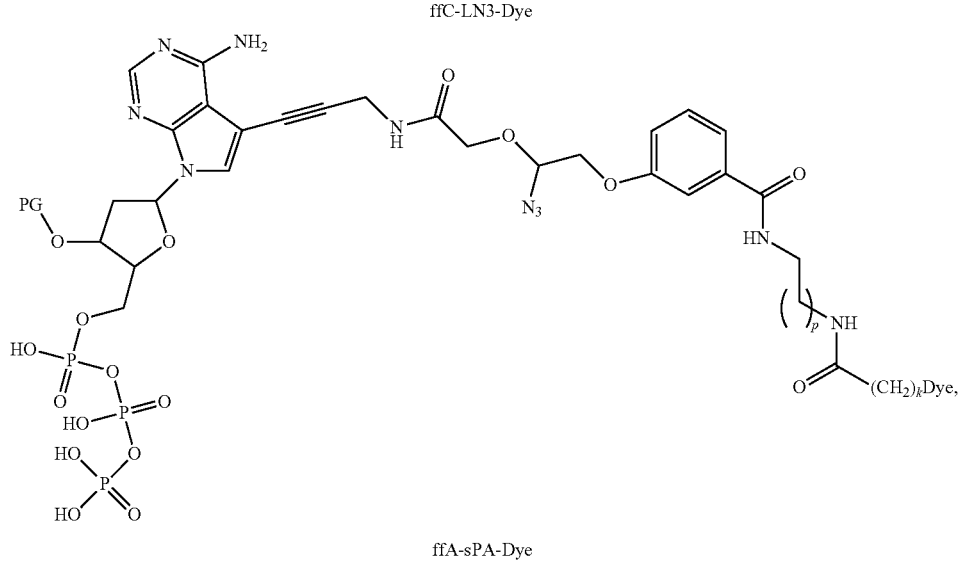

ffA-sPA-Dye

-continued
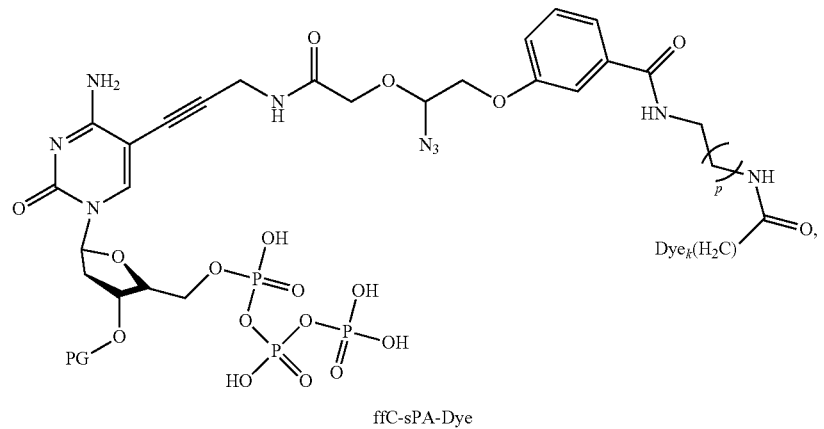
ffC-sPA-Dye
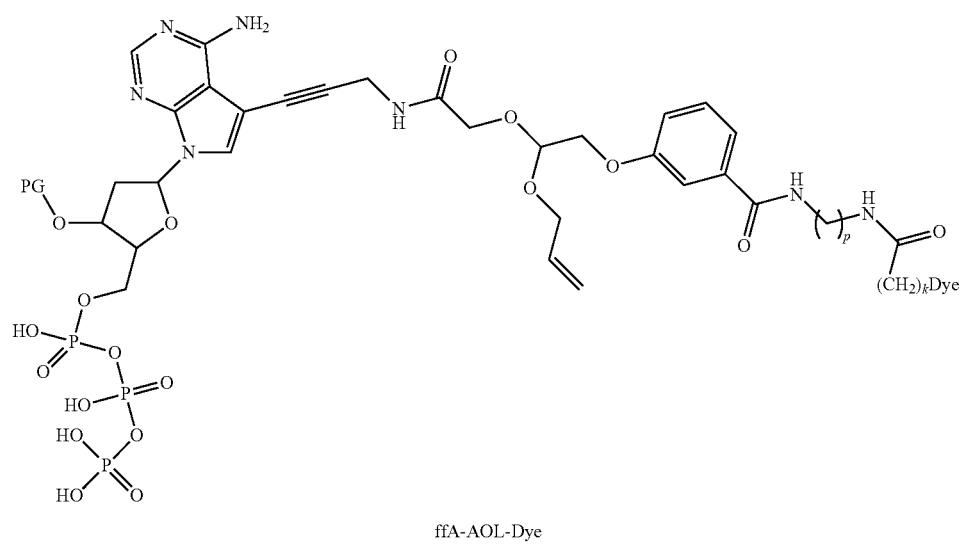
ffA-AOL-Dye
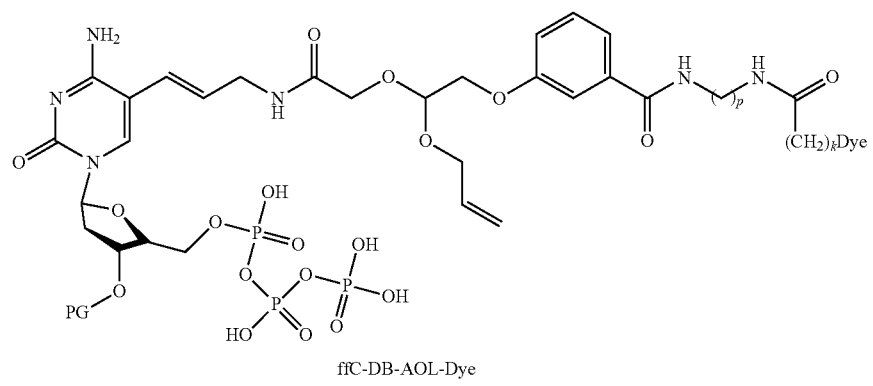
ffC-DB-AOL-Dye -continued

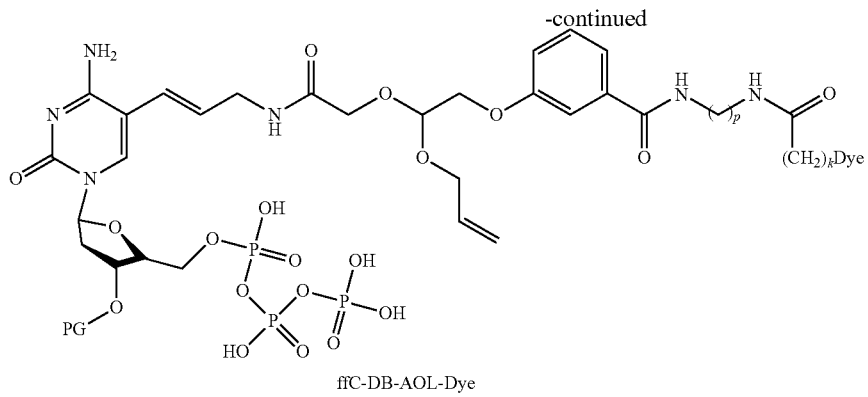

ffC-DB-AOL-Dye

In some embodiments, the nucleotides are selected from the group consisting of an analog of dGTP, an analog of dTTP, an analog of dUTP, an analog of dCTP, and an analog of dATP. In some embodiments, the first nucleotide is a first reversibly blocked nucleotide triphosphate (rbNTP), the second nucleotide is a second rbNTP, the third nucleotide is a third rbNTP, and the fourth nucleotide is a fourth rbNTP, wherein each of the first nucleotide, second nucleotide, third nucleotide and fourth nucleotide is a different type of nucleotide from the other. In some embodiments, the four rbNTPs are selected from the group consisting of rbATP, rbTTP, rbUTP, rbCTP, and rbGTP. In some embodiments, each of the four rbNTPs includes a modified base and a reversible terminator 3' blocking group. Non-limiting example of the 3' blocking group include azidomethyl (*—$CH_2N_3$), substituted azidomethyl (e.g., *—$CH(CHF_2)N_3$ or *—$CH(CH_2F)N_3$) and *—$CH_2$—O—$CH_2$—CH=$CH_2$, where the asterisk * indicates the point attachment to the 3' oxygen of the ribose or deoxyribose ring of the nucleotide.

Further details about the dyes and the fully functionalized nucleotides can be found in U.S. Patent Application Publication Numbers 2018/0094140 and 2020/0277670, International Patent Application Publication Number 2017/051201, and U.S. Provisional Patent Application Nos. 63/057,758 and 63/127,061, the disclosures of which are incorporated herein by reference in their entireties.

Samples

In some embodiments, the sample comprises or consists of a purified or isolated polynucleotide derived from a tissue sample, a biological fluid sample, a cell sample, and the like. Suitable biological fluid samples include, but are not limited to blood, plasma, serum, sweat, tears, sputum, urine, sputum, ear flow, lymph, saliva, cerebrospinal fluid, ravages, bone marrow suspension, vaginal flow, trans-cervical lavage, brain fluid, ascites, milk, secretions of the respiratory, intestinal and genitourinary tracts, amniotic fluid, milk, and leukophoresis samples. In some embodiments, the sample is a sample that is easily obtainable by non-invasive procedures, e.g., blood, plasma, serum, sweat, tears, sputum, urine, sputum, ear flow, saliva or feces. In certain embodiments the sample is a peripheral blood sample, or the plasma and/or serum fractions of a peripheral blood sample. In other embodiments, the biological sample is a swab or smear, a biopsy specimen, or a cell culture. In another embodiment, the sample is a mixture of two or more biological samples, e.g., a biological sample can comprise two or more of a biological fluid sample, a tissue sample, and a cell culture sample. As used herein, the terms "blood," "plasma" and "serum" expressly encompass fractions or processed portions thereof. Similarly, where a sample is taken from a biopsy, swab, smear, etc., the "sample" expressly encompasses a processed fraction or portion derived from the biopsy, swab, smear, etc.

In certain embodiments, samples can be obtained from sources, including, but not limited to, samples from different individuals, samples from different developmental stages of the same or different individuals, samples from different diseased individuals (e.g., individuals with cancer or suspected of having a genetic disorder), normal individuals, samples obtained at different stages of a disease in an individual, samples obtained from an individual subjected to different treatments for a disease, samples from individuals subjected to different environmental factors, samples from individuals with predisposition to a pathology, samples individuals with exposure to an infectious disease agent, and the like.

In one illustrative, but non-limiting embodiment, the sample is a maternal sample that is obtained from a pregnant female, for example a pregnant woman. The maternal sample can be a tissue sample, a biological fluid sample, or a cell sample. In another illustrative, but non-limiting embodiment, the maternal sample is a mixture of two or more biological samples, e.g., the biological sample can comprise two or more of a biological fluid sample, a tissue sample, and a cell culture sample.

In certain embodiments samples can also be obtained from in vitro cultured tissues, cells, or other polynucleotide-containing sources. The cultured samples can be taken from sources including, but not limited to, cultures (e.g., tissue or cells) maintained in different media and conditions (e.g., pH, pressure, or temperature), cultures (e.g., tissue or cells) maintained for different periods of length, cultures (e.g., tissue or cells) treated with different factors or reagents (e.g., a drug candidate, or a modulator), or cultures of different types of tissue and/or cells.

In some embodiments, the use of the disclosed sequencing technology does not involve the preparation of sequencing libraries. In other embodiments, the sequencing technology contemplated herein involve the preparation of sequencing libraries. In one illustrative approach, sequencing library preparation involves the production of a random collection of adapter-modified DNA fragments (e.g., polynucleotides) that are ready to be sequenced.

Sequencing libraries of polynucleotides can be prepared from DNA or RNA, including equivalents, analogs of either DNA or cDNA, for example, DNA or cDNA that is complementary or copy DNA produced from an RNA template, by the action of reverse transcriptase. The polynucleotides may originate in double-stranded form (e.g., dsDNA such as genomic DNA fragments, cDNA, PCR amplification products, and the like) or, in certain embodiments, the polynucleotides may originated in single-stranded form (e.g., ssDNA, RNA, etc.) and have been converted to dsDNA form. By way of illustration, in certain embodiments, single stranded mRNA molecules may be copied into double-stranded cDNAs suitable for use in preparing a sequencing library. The precise sequence of the primary polynucleotide molecules is generally not material to the method of library preparation, and may be known or unknown. In one embodiment, the polynucleotide molecules are DNA molecules. More particularly, in certain embodiments, the polynucleotide molecules represent the entire genetic complement of an organism or substantially the entire genetic complement of an organism, and are genomic DNA molecules (e.g., cellular DNA, cell free DNA (cfDNA), etc.), that typically include both intron sequence and exon sequence (coding sequence), as well as non-coding regulatory sequences such as promoter and enhancer sequences. In certain embodiments, the primary polynucleotide molecules comprise human genomic DNA molecules, e.g., cfDNA molecules present in peripheral blood of a pregnant subject.

Methods of isolating nucleic acids from biological sources may differ depending upon the nature of the source. One of skill in the art can readily isolate nucleic acids from a source as needed for the method described herein. In some instances, it can be advantageous to fragment large nucleic acid molecules (e.g. cellular genomic DNA) in the nucleic acid sample to obtain polynucleotides in the desired size range. Fragmentation can be random, or it can be specific, as achieved, for example, using restriction endonuclease digestion. Methods for random fragmentation may include, for example, limited DNase digestion, alkali treatment and physical shearing. Fragmentation can also be achieved by any of a number of methods known to those of skill in the art. For example, fragmentation can be achieved by mechanical means including, but not limited to nebulization, sonication and hydroshear.

In some embodiments, sample nucleic acids are obtained from as cfDNA, which is not subjected to fragmentation. For example, cfDNA, typically exists as fragments of less than about 300 base pairs and consequently, fragmentation is not typically necessary for generating a sequencing library using cfDNA samples.

Typically, whether polynucleotides are forcibly fragmented (e.g., fragmented in vitro), or naturally exist as fragments, they are converted to blunt-ended DNA having 5'-phosphates and 3'-hydroxyl. Standard protocols, e.g., protocols for sequencing using, for example, the Illumina platform, instruct users to end-repair sample DNA, to purify the end-repaired products prior to dA-tailing, and to purify the dA-tailing products prior to the adaptor-ligating steps of the library preparation.

In various embodiments, verification of the integrity of the samples and sample tracking can be accomplished by sequencing mixtures of sample genomic nucleic acids, e.g., cfDNA, and accompanying marker nucleic acids that have been introduced into the samples, e.g., prior to processing.

Sequencing Techniques

The disclosed sequencing systems and methods may be compatible with any sequencing techniques based on optical detection, for example, next-generation sequencing (NGS), fluorescent in situ sequencing (FISSEQ), and Massively Parallel Signature Sequencing (MPSS). In one embodiment, the disclosed systems and methods may be compatible with NGS technologies that allow multiple samples to be sequenced individually as genomic molecules (i.e., singleplex sequencing) or as pooled samples comprising indexed genomic molecules (e.g., multiplex sequencing) on a single sequencing run. These methods can generate up to several hundred million reads of DNA sequences.

The disclosed technology may implement sequencing reactions such as those incorporating sequencing-by-synthesis methods described in U.S. Patent Application Publication Numbers 2007/0166705, 2006/0188901, 2006/0240439, 2006/0281109, 2005/0100900, U.S. Pat. No. 7,057,026, PCT Application Publication Numbers WO 2005/065814, WO 2006/064199, and WO 2007/010251, the disclosures of which are incorporated herein by reference in their entireties. In some embodiments, the sequencers may implement sequencing-by-synthesis methods similar to those used in the HiSeq, MiSeq, or HiScanSQ systems from Illumina (San Diego, Calif.).

Alternatively, sequencing by ligation techniques may be used in the disclosed technology, such as described in U.S. Pat. Nos. 6,969,488, 6,172,218, and 6,306,597, the disclosures of which are incorporated herein by reference in their entireties. Sequencing by ligation techniques use DNA ligase to incorporate oligonucleotides and identify the incorporation of such oligonucleotides.

The disclosed technology may be implemented in some sequencing techniques which are available commercially, such as the sequencing-by-hybridization platform from Affymetrix Inc. (Sunnyvale, CA) and the sequencing-by-synthesis platforms from 454 Life Sciences (Bradford, CT) and Helicos Biosciences (Cambridge, MA), the sequencing-by-ligation platform from Applied Biosystems (Foster City, CA), or the SMRT technology of Pacific Biosciences.

In one illustrative, but non-limiting, embodiment, the methods described herein comprise obtaining sequence information for the nucleic acids in a sample using Illumina's sequencing-by-synthesis and reversible terminator-based sequencing chemistry (e.g. as described in Bentley et al., Nature 6:53-59 [2009]). Illumina's sequencing technology may include the attachment of fragmented genomic DNA to a planar, optically transparent surface on which oligonucleotide anchors are bound. For example, template DNA is end-repaired to generate 5'-phosphorylated blunt ends, and the polymerase activity of Klenow fragment is used to add a single A base to the 3' end of the blunt phosphorylated DNA fragments. This addition prepares the DNA fragments for ligation to oligonucleotide adapters, which have an overhang of a single T base at their 3' end to increase ligation efficiency. The adapter oligonucleotides are complementary to the flowcell anchor oligos. Under limiting-dilution conditions, adapter-modified, single-stranded template DNA is added to the flowcell and immobilized by hybridization to the anchor oligos. Attached DNA fragments are extended and bridge amplified to create an ultra-high density sequencing flowcell with hundreds of millions of clusters, each containing about 1,000 copies of the same template. In one embodiment, the randomly fragmented genomic DNA is amplified using PCR before it is subjected to cluster amplification. Alternatively, an amplification-free (e.g., PCR free) genomic library preparation is used, and the randomly fragmented genomic DNA is enriched using the cluster amplification alone (Kozarewa et al., Nature Methods 6:291-295 [2009]). The sequencing-by-synthesis reaction may employ reversible terminators with removable fluorescent dyes. Short sequence reads of about tens to a few hundred base pairs are aligned against a reference genome and unique mapping of the short sequence reads to the reference genome are identified. After completion of the first read, the templates can be regenerated in situ to enable a second read from the opposite end of the fragments. Thus, either single-end or paired end sequencing of the DNA fragments can be used. Detailed information about paired end sequencing can be found in U.S. Pat. No. 7,601,499 and US Patent Publication No. 2012/0,053,063, which are incorporated by reference.

In some embodiments, the sequencing by synthesis platform by Illumina involves clustering fragments. Clustering is a process in which each fragment molecule is isothermally amplified. In some embodiments, the fragment has two different adaptors attached to the two ends of the fragment, the adaptors allowing the fragment to hybridize with the two different oligos on the surface of a flowcell lane. The fragment further includes or is connected to two index sequences at two ends of the fragment, where index sequences provide labels to identify different samples in multiplex sequencing.

In some implementation, a flowcell for clustering in the Illumina platform is a glass slide with lanes. Each lane is a glass channel coated with a lawn of two types of oligos. Hybridization is enabled by the first of the two types of oligos on the surface. This oligo is complementary to a first adapter on one end of the fragment. A polymerase creates a compliment strand of the hybridized fragment. The double-stranded molecule is denatured, and the original template strand is washed away. The remaining strand, in parallel with many other remaining strands, is clonally amplified through bridge application.

In bridge amplification, a strand folds over, and a second adapter region on a second end of the strand hybridizes with the second type of oligos on the flowcell surface. A polymerase generates a complimentary strand, forming a double-stranded bridge molecule. This double-stranded molecule is denatured resulting in two single-stranded molecules tethered to the flowcell through two different oligos. The process is then repeated over and over, and occurs simultaneously for millions of clusters resulting in clonal amplification of all the fragments. After bridge amplification, the reverse strands are cleaved and washed off, leaving only the forward strands. The 3' ends are blocked to prevent unwanted priming.

After clustering, sequencing starts with extending a first sequencing primer to generate the first read. With each cycle, fluorescently tagged nucleotides compete for addition to the growing chain. Only one is incorporated based on the sequence of the template. After the addition of each nucleotide, the cluster is excited by a light source, and a characteristic fluorescent signal is emitted. The number of cycles determines the length of the read. The emission wavelength and the signal intensity determine the base call. For a given cluster all identical strands are read simultaneously. Hundreds of millions of clusters, or thousands to tens of thousands of millions of clusters, are sequenced in a massively parallel manner. At the completion of the first read, the read product is washed away.

In processes involving two index primers, an index 1 primer is introduced and hybridized to an index 1 region on the template. Index regions provide identification of fragments, which is useful for de-multiplexing samples in a multiplex sequencing process. The index 1 read is generated similar to the first read. After completion of the index 1 read, the read product is washed away and the 3' end of the strand is de-protected. The template strand then folds over and binds to a second oligo on the flowcell. An index 2 sequence is read in the same manner as index 1. Then an index 2 read product is washed off at the completion of the step.

After reading two indices, read 2 initiates by using polymerases to extend the second flowcell oligos, forming a double-stranded bridge. This double-stranded DNA is denatured, and the 3' end is blocked. The original forward strand is cleaved off and washed away, leaving the reverse strand. Read 2 begins with the introduction of a read 2 sequencing primer. As with read 1, the sequencing steps are repeated until the desired length is achieved. The read 2 product is washed away. This entire process generates millions of reads, representing all the fragments. Sequences from pooled sample libraries are separated based on the unique indices introduced during sample preparation. For each sample, reads of similar stretches of base calls are locally clustered. Forward and reversed reads are paired creating contiguous sequences. These contiguous sequences are aligned to the reference genome for variant identification.

Computing Systems

In some embodiments, the disclosed systems and methods may involve approaches for shifting or distributing certain sequence data analysis features and sequence data storage to a cloud computing environment or cloud-based network. User interaction with sequencing data, genome data, or other types of biological data may be mediated via a central hub that stores and controls access to various interactions with the data. In some embodiments, the cloud computing environment may also provide sharing of protocols, analysis methods, libraries, sequence data as well as distributed processing for sequencing, analysis, and reporting. In some embodiments, the cloud computing environment facilitates modification or annotation of sequence data by users. In some embodiments, the systems and methods may be implemented in a computer browser, on-demand or on-line.

In some embodiments, software written to perform the methods as described herein is stored in some form of computer readable medium, such as memory, CD-ROM, DVD-ROM, memory stick, flash drive, hard drive, SSD hard drive, server, mainframe storage system and the like.

In some embodiments, the methods may be written in any of various suitable programming languages, for example compiled languages such as C™, C#®, C++™, FORTRAN™, and JAVA®. Other programming languages could be script languages, such as PERL®, MATLAB®, SAS®, SPSS®, PYTHON®, RUBY™, PASCAL™, DELPHI®, R™ and PHP®. In some embodiments, the methods are written in C™, C#®, C++™, FORTRAN™, JAVA®, PERL®, R™, JAVA® or PYTHON®. In some embodiments, the method may be an independent application with data input and data display modules. Alternatively, the method may be a computer software product and may include classes wherein distributed objects comprise applications including computational methods as described herein.

In some embodiments, the methods may be incorporated into pre-existing data analysis software, such as that found on sequencing instruments. Software comprising computer implemented methods as described herein are installed either onto a computer system directly, or are indirectly held on a computer readable medium and loaded as needed onto a computer system. Further, the methods may be located on computers that are remote to where the data is being produced, such as software found on servers and the like that are maintained in another location relative to where the data is being produced, such as that provided by a third party service provider.

An assay instrument, desktop computer, laptop computer, or server which may contain a processor in operational communication with accessible memory comprising instructions for implementation of systems and methods. In some embodiments, a desktop computer or a laptop computer is in operational communication with one or more computer readable storage media or devices and/or outputting devices. An assay instrument, desktop computer and a laptop computer may operate under a number of different computer based operational languages, such as those utilized by Apple based computer systems or PC based computer systems. An assay instrument, desktop and/or laptop computers and/or server system may further provide a computer interface for creating or modifying experimental definitions and/or conditions, viewing data results and monitoring experimental progress. In some embodiments, an outputting device may be a graphic user interface such as a computer monitor or a computer screen, a printer, a hand-held device such as a personal digital assistant (i.e., PDA, Blackberry, iPhone), a tablet computer (e.g., iPAD), a hard drive, a server, a memory stick, a flash drive and the like.

A computer readable storage device or medium may be any device such as a server, a mainframe, a supercomputer, a magnetic tape system and the like. In some embodiments, a storage device may be located onsite in a location proximate to the assay instrument, for example adjacent to or in close proximity to, an assay instrument. For example, a storage device may be located in the same room, in the same building, in an adjacent building, on the same floor in a building, on different floors in a building, etc. in relation to the assay instrument. In some embodiments, a storage device may be located off-site, or distal, to the assay instrument. For example, a storage device may be located in a different part of a city, in a different city, in a different state, in a different country, etc. relative to the assay instrument. In embodiments where a storage device is located distal to the assay instrument, communication between the assay instrument and one or more of a desktop, laptop, or server is typically via Internet connection, either wireless or by a network cable through an access point. In some embodiments, a storage device may be maintained and managed by the individual or entity directly associated with an assay instrument, whereas in other embodiments a storage device may be maintained and managed by a third party, typically at a distal location to the individual or entity associated with an assay instrument. In embodiments as described herein, an outputting device may be any device for visualizing data.

An assay instrument, desktop, laptop and/or server system may be used itself to store and/or retrieve computer implemented software programs incorporating computer code for performing and implementing computational methods as described herein, data for use in the implementation of the computational methods, and the like. One or more of an assay instrument, desktop, laptop and/or server may comprise one or more computer readable storage media for storing and/or retrieving software programs incorporating computer code for performing and implementing computational methods as described herein, data for use in the implementation of the computational methods, and the like. Computer readable storage media may include, but is not limited to, one or more of a hard drive, a SSD hard drive, a CD-ROM drive, a DVD-ROM drive, a floppy disk, a tape, a flash memory stick or card, and the like. Further, a network including the Internet may be the computer readable storage media. In some embodiments, computer readable storage media refers to computational resource storage accessible by a computer network via the Internet or a company network offered by a service provider rather than, for example, from a local desktop or laptop computer at a distal location to the assay instrument.

In some embodiments, computer readable storage media for storing and/or retrieving computer implemented software programs incorporating computer code for performing and implementing computational methods as described herein, data for use in the implementation of the computational methods, and the like, is operated and maintained by a service provider in operational communication with an assay instrument, desktop, laptop and/or server system via an Internet connection or network connection.

In some embodiments, a hardware platform for providing a computational environment comprises a processor (i.e., CPU) wherein processor time and memory layout such as random access memory (i.e., RAM) are systems considerations. For example, smaller computer systems offer inexpensive, fast processors and large memory and storage capabilities. In some embodiments, graphics processing units (GPUs) can be used. In some embodiments, hardware platforms for performing computational methods as described herein comprise one or more computer systems with one or more processors. In some embodiments, smaller computer are clustered together to yield a supercomputer network.

In some embodiments, computational methods as described herein are carried out on a collection of inter- or intra-connected computer systems (i.e., grid technology) which may run a variety of operating systems in a coordinated manner. For example, the CONDOR framework (University of Wisconsin-Madison) and systems available through United Devices are exemplary of the coordination of multiple stand-alone computer systems for the purpose dealing with large amounts of data. These systems may offer Perl interfaces to submit, monitor and manage large sequence analysis jobs on a cluster in serial or parallel configurations.

Definitions

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, NY 1994); Sambrook et al., Molecular Cloning, A Laboratory Manual, Cold Spring Harbor Press (Cold Spring Harbor, NY 1989). For purposes of the present disclosure, the following terms are defined below.

As used herein, the terms "well", "cavity" and "chamber" are used synonymously, and refer to a discrete feature defined in the device that can contain a fluid (e.g., liquid, gel, gas). Examples of an array of the present device may have one or multiple wells. Further, it is to be understood that the cross-section of a well taken parallel to a surface of a substrate at least partially defining the well can be curved, square, polygonal, hyperbolic, conical, angular, etc.

As used herein, the term "cluster" or "clump" refers to a group of molecules, e.g., a group of DNA, or a group of signals. In some embodiments, the signals of a cluster are derived from different features. In some embodiments, a signal clump represents a physical region covered by one amplified oligonucleotide. Each signal clump could be ideally observed as several signals. Accordingly, duplicate signals could be detected from the same clump of signals. In some embodiments, a cluster or clump of signals can comprise one or more signals or spots that correspond to a particular feature. When used in connection with microarray devices or other molecular analytical devices, a cluster can comprise one or more signals that together occupy the physical region occupied by an amplified oligonucleotide (or other polynucleotide or polypeptide with a same or similar sequence). For example, where a feature is an amplified oligonucleotide, a cluster can be the physical region covered by one amplified oligonucleotide. In other embodiments, a cluster or clump of signals need not strictly correspond to a feature. For example, spurious noise signals may be included in a signal cluster but not necessarily be within the feature area. For example, a cluster of signals from four cycles of a sequencing reaction could comprise at least four signals.

As used herein, the term "spot radius" or "cluster radius" refers to a defined radius which encompasses a diffraction-limited spot or a cluster of signals. Accordingly, by defining a cluster radius as larger or smaller, a greater number of signals can fall within the radius for subsequent ordering and selection. A cluster radius can be defined by any distance measure, such as pixels, meters, millimeters, or any other useful measure of distance.

As used herein, a "signal" refers to a detectable event such as an emission, such as light emission, for example, in an image. Thus, in some embodiments, a signal can represent any detectable light emission that is captured in an image (i.e., a "spot"). Thus, as used herein, "signal" can refer to an actual emission from a feature of the specimen, or can refer to a spurious emission that does not correlate to an actual feature. Thus, a signal could arise from noise and could be later discarded as not representative of an actual feature of a specimen.

As used herein, an "intensity" of an emitted light refers to the intensity of the light transferred per unit area, where the area is measured on the plane perpendicular to the direction of propagation of the light ray, and where the intensity is the amount of energy transferred per unit time. In some embodiments, signal "strength", "amplitude", "magnitude" or "level" may be used synonymously with signal intensity. In some embodiments, an image taken by a detector is approximately or proportional to an intensity map integrated over some amount of time. In some embodiments, the signal of a diffraction-limited spot of a DNA cluster is extracted from the image as the total intensity included in the spot, up to a factor of the integration time. For example, the signal of a DNA cluster may be defined as the intensity included within the spot radius of the DNA cluster, up to a factor of the integration time. In other embodiments, the peak intensity value found within the spot radius may be used to represent the signal of the DNA cluster, up to a factor of the integration time.

As used herein, the process of aligning the template of signal positions onto a given image is referred to as "registration", and the process for determining an intensity value or a intensity value for each signal in the template for a given image is referred to as "intensity extraction". For registration, the methods and systems provided herein may take advantage of the random nature of signal clump positions by using image correlation to align the template to the image.

As used herein, a "nucleotide" includes a nitrogen containing heterocyclic base, a sugar, and one or more phosphate groups. Nucleotides are monomeric units of a nucleic acid sequence. Examples of nucleotides include, for example, ribonucleotides or deoxyribonucleotides. In ribonucleotides (RNA), the sugar is a ribose, and in deoxyribonucleotides (DNA), the sugar is a deoxyribose, i.e., a sugar lacking a hydroxyl group that is present at the 2' position in ribose. The nitrogen containing heterocyclic base can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. The phosphate groups may be in the mono-, di-, or tri-phosphate form. These nucleotides may be natural nucleotides, but it is to be further understood that non-natural nucleotides, modified nucleotides or analogs of the aforementioned nucleotides can also be used.

As used herein, "nucleobase" is a heterocyclic base such as adenine, guanine, cytosine, thymine, uracil, inosine, xanthine, hypoxanthine, or a heterocyclic derivative, analog, or tautomer thereof. A nucleobase can be naturally occurring or synthetic. Non-limiting examples of nucleobases are adenine, guanine, thymine, cytosine, uracil, xanthine, hypoxanthine, 8-azapurine, purines substituted at the 8 position with methyl or bromine, 9-oxo-N6-methyladenine, 2-aminoadenine, 7-deazaxanthine, 7-deazaguanine, 7-deaza-adenine, N4-ethanocytosine, 2,6-diaminopurine, N6-ethano-2, 6-diaminopurine, 5-methylcytosine, 5-(C3-C6)-alkynylcytosine, 5-fluorouracil, 5-bromouracil, thiouracil, pseudoisocytosine, 2-hydroxy-5-methyl-4-triazolopyridine, isocytosine, isoguanine, inosine, 7,8-dimethylalloxazine, 6-dihydrothymine, 5,6-dihydrouracil, 4-methyl-indole, ethenoadenine and the non-naturally occurring nucleobases described in U.S. Pat. Nos. 5,432,272 and 6,150,510 and PCT applications WO 92/002258, WO 93/10820, WO 94/22892, and WO 94/24144, and Fasman ("Practical Handbook of Biochemistry and Molecular Biology", pp. 385-394, 1989, CRC Press, Boca Raton, LO), all herein incorporated by reference in their entireties.

The term "nucleic acid" or "polynucleotide" refers to a deoxyribonucleotide or ribonucleotide polymer in either single- or double-stranded form, and unless otherwise limited, encompasses known analogs of natural nucleotides that hybridize to nucleic acids in manner similar to naturally occurring nucleotides, such as peptide nucleic acids (PNAs) and phosphorothioate DNA. Unless otherwise indicated, a particular nucleic acid sequence includes the complementary sequence thereof. Nucleotides include, but are not limited to, ATP, dATP, CTP, dCTP, GTP, dGTP, UTP, TTP, dUTP, 5-methyl-CTP, 5-methyl-dCTP, ITP, dITP, 2-amino-adenosine-TP, 2-amino-deoxyadenosine-TP, 2-thiothymidine triphosphate, pyrrolo-pyrimidine triphosphate, and 2-thiocytidine, as well as the alphathiotriphosphates for all of the above, and 2'-O-methyl-ribonucleotide triphosphates for all the above bases. Modified bases include, but are not limited to, 5-Br-UTP, 5-Br-dUTP, 5-F-UTP, 5-F-dUTP, 5-propynyl dCTP, and 5-propynyl-dUTP.

The polymerase used is an enzyme generally for joining 3'-OH 5'-triphosphate nucleotides, oligomers, and their analogs. Polymerases include, but are not limited to, DNA-dependent DNA polymerases, DNA-dependent RNA polymerases, RNA-dependent DNA polymerases, RNA-dependent RNA polymerases, T7 DNA polymerase, T3 DNA polymerase, T4 DNA polymerase, T7 RNA polymerase, T3 RNA polymerase, SP6 RNA polymerase, DNA polymerase I, Klenow fragment, *Thermophilus aquaticus* DNA polymerase, Tth DNA polymerase, VentR® DNA polymerase (New England Biolabs), Deep VentR® DNA polymerase (New England Biolabs), Bst DNA Polymerase Large Fragment, Stoeffel Fragment, 9°N DNA Polymerase, 9°N DNA polymerase, Pfu DNA Polymerase, Tfl DNA Polymerase, Tth DNA Polymerase, RepliPHI Phi29 Polymerase, TIi DNA polymerase, eukaryotic DNA polymerase beta, telomerase, Therminator™ polymerase (New England Biolabs), KOD HiFi™ DNA polymerase (Novagen), KOD1 DNA polymerase, Q-beta replicase, terminal transferase, AMV reverse transcriptase, M-MLV reverse transcriptase, Phi6 reverse transcriptase, HIV-1 reverse transcriptase, novel polymerases discovered by bioprospecting, and polymerases cited in US 2007/0048748, U.S. Pat. Nos. 6,329,178, 6,602,695, and 6,395,524 (incorporated by reference). These polymerases include wild-type, mutant isoforms, and genetically engineered variants. "Encode" or "parse" are verbs referring to transferring from one format to another, and refers to transferring the genetic information of target template base sequence into an arrangement of reporters.

Nucleosides and nucleotides may be labeled at sites on the sugar or nucleobase. A dye may be attached to any position on the nucleotide base, for example, through a linker. In particular embodiments, Watson-Crick base pairing can still be carried out for the resulting analog. Particular nucleobase labeling sites include the C5 position of a pyrimidine base or the C7 position of a 7-deaza purine base. A linker group may be used to covalently attach a dye to the nucleoside or nucleotide. As used herein, the term "covalently attached" or "covalently bonded" refers to the forming of a chemical bonding that is characterized by the sharing of pairs of electrons between atoms. For example, a covalently attached polymer coating refers to a polymer coating that forms chemical bonds with a functionalized surface of a substrate, as compared to attachment to the surface via other means, for example, adhesion or electrostatic interaction. It will be appreciated that polymers that are attached covalently to a surface can also be bonded via means in addition to covalent attachment.

Various different types of linkers having different lengths and chemical properties can be used. The term "linker" encompasses any moiety that is useful to connect one or more molecules or compounds to each other, to other components of a reaction mixture, and/or to a reaction site. For example, a linker can attach a reporter molecule or "label" (e.g., a fluorescent dye) to a reaction component. In certain embodiments, the linker is a member selected from substituted or unsubstituted alkyl (e.g., a 2-5 carbon chain), substituted or unsubstituted heteroalkyl, substituted or unsubstituted aryl, substituted or unsubstituted heteroaryl, substituted or unsubstituted cycloalkyl, and substituted or unsubstituted heterocycloalkyl. In one example, the linker moiety is selected from straight- and branched carbon-chains, optionally including at least one heteroatom (e.g., at least one functional group, such as ether, thioether, amide, sulfonamide, carbonate, carbamate, urea and thiourea), and optionally including at least one aromatic, heteroaromatic or non-aromatic ring structure (e.g., cycloalkyl, phenyl). In certain embodiments, molecules that have trifunctional linkage capability are used, including, but are not limited to, cynuric chloride, mealamine, diaminopropanoic acid, aspartic acid, cysteine, glutamic acid, pyroglutamic acid, S-acetylmercaptosuccinic anhydride, carbobenzoxylysine, histine, lysine, serine, homoserine, tyrosine, piperidinyl-1, 1-amino carboxylic acid, diaminobenzoic acid, etc. In certain specific embodiments, a hydrophilic PEG (polyethylene glycol) linker is used.

In certain embodiments, linkers are derived from molecules which comprise at least two reactive functional groups (e.g., one on each terminus), and these reactive functional groups can react with complementary reactive functional groups on the various reaction components or used to immobilize one or more reaction components at the reaction site. "Reactive functional group," as used herein refers to groups including, but not limited to, olefins, acetylenes, alcohols, phenols, ethers, oxides, halides, aldehydes, ketones, carboxylic acids, esters, amides, cyanates, isocyanates, thiocyanates, isothiocyanates, amines, hydrazines, hydrazones, hydrazides, diazo, diazonium, nitro, nitriles, mercaptans, sulfides, disulfides, sulfoxides, sulfones, sulfonic acids, sulfinic acids, acetals, ketals, anhydrides, sulfates, sulfenic acids isonitriles, amidines, imides, imidates, nitrones, hydroxylamines, oximes, hydroxamic acids thiohydroxamic acids, allenes, ortho esters, sulfites, enamines, ynamines, ureas, pseudoureas, semicarbazides, carbodiimides, carbamates, imines, azides, azo compounds, azoxy compounds, and nitroso compounds. Reactive functional groups also include those used to prepare bioconjugates, e.g., N-hydroxysuccinimide esters, maleimides and the like.

Cleavable linkers may be, by way of non-limiting example, electrophilically cleavable linkers, nucleophilically cleavable linkers, photocleavable linkers, cleavable under reductive conditions (for example disulfide or azide containing linkers), oxidative conditions, cleavable via use of safety-catch linkers and cleavable by elimination mechanisms. The use of a cleavable linker to attach the dye compound to a substrate moiety ensures that the label can, if required, be removed after detection, avoiding any interfering signal in downstream steps.

In some embodiments, one or more dye or label molecules may attach to the nucleotide base by non-covalent interactions, or by a combination of covalent and non-covalent interactions via a plurality of intermediating molecules. In one example, a nucleotide or a nucleotide analog, being newly incorporated by the polymerase synthesizing from a target polynucleotide, is initially unlabeled. Then, one or more fluorescent labels may be introduced to the nucleotide or nucleotide analog by binding to labeled affinity reagents containing one or more fluorescent dyes. Uses of unlabeled nucleotides and affinity reagents in sequencing by synthesis have been disclosed in U.S. Publication No. 2013/0079232, which is incorporated herein by reference. For example, one, two, three or each of the four different types of nucleotides (e.g., dATP, dCTP, dGTP and dTTP or dUTP) in the reaction mix may be initially unlabeled. Each of the four types of nucleotides (e.g., dNTPs) may have a 3' hydroxy blocking group to ensure that only a single base can be added by a polymerase to the 3' end of a copy polynucleotide being synthesized from the target polynucleotide. After incorporation of an unlabeled nucleotide, an affinity reagent may be then introduced that specifically binds to the incorporated dNTP to provide a labeled extension product comprising the incorporated dNTP. The affinity reagent may be designed to specifically bind to the incorporated dNTP via antibody-antigen interaction or ligand-receptor interaction, for example. The dNTP may be modified to include a specific antigen, which will pair with a specific antibody included in the corresponding affinity reagent. Thus, one, two, three or each of the four different types of nucleotides may be specifically labeled via their corresponding affinity reagents. In some embodiments, the affinity reagents may include small molecules or protein tags that may bind to a hapten moiety of the nucleotide (such as streptavidin-biotin, anti-DIG and DIG, anti-DNP and DNP), antibody (including but not limited to binding fragments of antibodies, single chain antibodies, bispecific antibodies, and the like), aptamers, knottins, affimers, or any other known agent that binds an incorporated nucleotide with a suitable specificity and affinity. In some embodiments, the hapten moiety of the unlabeled nucleotide may be attached to the nucleobase through a cleavable linker, which may be cleaved under the same reaction condition as that for removing the 3' blocking group. In some embodiments, one affinity reagent may be labeled with multiple copies of the same fluorescent dye, for example, 1, 2, 3, 4, 5, 6, 8, 10, 12, 15 copies of the same dye. In some embodiments, each affinity reagent may be labeled with a different number of copies of the same fluorescent dye. In some embodiments, a first affinity reagent may be labeled with a first number of a first fluorescent dye, a second affinity reagent may be labeled with a second number of a second fluorescent dye, a third affinity reagent may be labeled with a third number of a third fluorescent dye, and a fourth affinity reagent may be labeled with a fourth number of a fourth fluorescent dye. In some embodiments, each affinity reagent may be labeled with a distinct combination of one of more types of dye, where each type of dye has a certain copy number. In some embodiments, different affinity reagents may be labeled with different dyes that can be excited by the same light source, but each dye will have a distinguishable fluorescent intensity or a distinguishable emission spectrum. In some embodiments, different affinity reagents may be labeled with the same dye in different molar ratios to create measurable differences in their fluorescent intensities.

A nucleotide analog may be attached to or associated with one or more photo-detectable labels to provide a detectable signal. In some embodiments, a photo-detectable label may be a fluorescent compound, such as a small molecule fluorescent label. Fluorescent molecules (fluorophores) suitable as a fluorescent label include, but are not limited to: 1,5 IAEDANS; 1,8-ANS; 4-methylumbelliferone; 5-carboxy-2, 7-dichlorofluorescein; 5-carboxyfluorescein (5-FAM); fluorescein amidite (FAM); 5-carboxynapthofluorescein; tetrachloro-6-carboxyfluorescein (TET); hexachloro-6-carboxyfluorescein (HEX); 2,7-dimethoxy-4,5-dichloro-6-carboxyfluorescein (JOE); VIC®; NED™; tetramethylrhodamine (TMR); 5-carboxytetramethylrhodamine (5-TAMRA); 5-HAT (Hydroxy Tryptamine); 5-hydroxy tryptamine (HAT); 5-ROX (carboxy-X-rhodamine); 6-carboxyrhodamine 6G; 6-JOE; Light Cycler® red 610; Light Cycler® red 640; Light Cycler® red 670; Light Cycler® red 705; 7-amino-4-methylcoumarin; 7-aminoactinomycin D (7-AAD); 7-hydroxy-4-methylcoumarin; 9-amino-6-chloro-2-methoxyacridine; 6-methoxy-N-(4-aminoalkyl)quinolinium bromide hydrochloride (AB Q); Acid Fuchsin; ACMA (9-amino-6-chloro-2-methoxyacridine); Acridine Orange; Acridine Red; Acridine Yellow; Acriflavin; Acriflavin Feulgen SITSA; AFPs-AutoFluorescent Protein-(Quantum Biotechnologies); Texas Red; Texas Red-X conjugate; Thiadicarbocyanine (DiSC3); Thiazine Red R; Thiazole Orange; Thioflavin 5; Thioflavin S; Thioflavin TCN; Thiolyte; Thiozole Orange; Tinopol CBS (Calcofluor White); TMR; TO-PRO-1; TO-PRO-3; TO-PRO-5; TOTO-1; TOTO-3; TriColor (PE-Cy5); TRITC (TetramethylRodamine-lsoThioCyanate); True Blue; TruRed; Ultralite; Uranine B; Uvitex SFC; WW 781; X-Rhodamine; X-Rhodamine-5-(and-6)-Isothiocyanate (5(6)-XRITC); Xylene Orange; Y66F; Y66H; Y66 W; YO-PRO-1; YO-PRO-3; YOYO-1; interchelating dyes such as YOYO-3, Sybr Green, Thiazole orange; members of the Alexa Fluor® dye series (from Molecular Probes/Invitrogen) which cover a broad spectrum and match the principal output wavelengths of common excitation sources such as Alexa Fluor 350, Alexa Fluor 405, 430, 488, 500, 514, 532, 546, 555, 568, 594, 610, 633, 635, 647, 660, 680, 700, and 750; members of the Cy Dye fluorophore series (GE Healthcare), also covering a wide spectrum such as Cy3, Cy3B, Cy3.5, Cy5, Cy5.5, Cy7; members of the Oyster® dye fluorophores (Denovo Biolabels) such as Oyster-500, -550, -556, 645, 650, 656; members of the DY-Labels series (Dyomics), for example, with maxima of absorption that range from 418 nm (DY-415) to 844 nm (DY-831) such as DY-415, -495, -505, -547, -548, -549, -550, -554, -555, -556, -560, -590, -610, -615, -630, -631, -632, -633, -634, -635, -636, -647, -648, -649, -650, -651, -652, -675, -676, -677, -680, -681, -682, -700, -701, -730, -731, -732, -734, -750, -751, -752, -776, -780, -781, -782, -831, -480XL, -481XL, -485XL, -510XL, -520XL, -521XL; members of the ATTO series of fluorescent labels (ATTO-TEC GmbH) such as ATTO 390, 425, 465, 488, 495, 520, 532, 550, 565, 590, 594, 610, 611X, 620, 633, 635, 637, 647, 647N, 655, 680, 700, 725, 740; members of the CAL Fluor® series or Quasar® series of dyes (Biosearch Technologies) such as CAL Fluor® Gold 540, CAL Fluor® Orange 560, Quasar® 570, CAL Fluor® Red 590, CAL Fluor® Red 610, CAL Fluor® Red 635, Quasar® 570, and Quasar® 670. In some embodiments, a first photo-detectable label interacts with a second photo-detectable moiety to modify the detectable signal, e.g., via fluorescence resonance energy transfer ("FRET"; also known as Förster resonance energy transfer).

The fluorescent labels utilized by the systems and methods disclosed herein can have different peak absorption wavelengths, for example, ranging from 400 nm to 800 nm. In some embodiments, the peak absorption wavelengths of the fluorescent labels can be, or be about, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800 nm, or a number or a range between any two of these values. In some embodiments the peak absorption wavelengths of the fluorescent labels can be at least, or at most, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, or 800 nm.

The fluorescent labels can have different peak emission wavelength, for example, ranging from 400 nm to 800 nm. In some embodiments, the peak emission wavelengths of the fluorescent labels can be, or be about, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800 nm, or a number or a range between any two of these values. In some embodiments the peak emission wavelengths of the fluorescent labels can be at least, or at most, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, or 800 nm.

The fluorescent labels can have different Stokes shift, for example, ranging from 10 nm to 200 nm. In some embodiments, the stoke shift can be, or be about, 10, 20, 30, 40, 50, 60, 70, 80, 90, 100, 110, 120, 130, 140, 150, 160, 170, 180, 190, 200 nm, or a number or a range between any two of these values. In some embodiments, the stoke shift can be at least, or at most, 10, 20, 30, 40, 50, 60, 70, 80, 90, 100, 110, 120, 130, 140, 150, 160, 170, 180, 190, or 200 nm.

In some embodiments, the distance between the peak emission wavelengths of any two fluorescent labels can vary, for example, ranging from 10 nm to 200 nm. In some embodiments, the distance between the peak emission wavelengths of any two fluorescent labels can be, or be about, 10, 20, 30, 40, 50, 60, 70, 80, 90, 100, 110, 120, 130, 140, 150, 160, 170, 180, 190, 200 nm, or a number or a range between any two of these values. In some embodiments, the distance between the peak emission wavelengths of any two fluorescent labels can be at least, or at most, 10, 20, 30, 40, 50, 60, 70, 80, 90, 100, 110, 120, 130, 140, 150, 160, 170, 180, 190, or 200 nm.

A "light source" may be any device capable of emitting energy along the electromagnetic spectrum. A light source may be a source of visible light (VIS), ultraviolet light (UV) and/or infrared light (IR). "Visible light" (VIS) generally refers to the band of electro-magnetic radiation with a wavelength from about 400 nm to about 750 nm. "Ultraviolet (UV) light" generally refers to electromagnetic radiation with a wavelength shorter than that of visible light, or from about 10 nm to about 400 nm range. "Infrared light" or infrared radiation (IR) generally refers to electromagnetic radiation with a wavelength greater than the VIS range, or from about 750 nm to about 50,000 nm. A light source may also provide full spectrum light. Light sources may output light from a selected wavelength or a range of wavelengths. In some embodiments of the invention, the light source may be configured to provide light above or below a predetermined wavelength, or may provide light within a predetermined range. A light source may be used in combination with a filter, to selectively transmit or block light of a selected wavelength from the light source. A light source may be connected to a intensity source by one or more electrical connectors; an array of light sources may be connected to a intensity source in series or in parallel. A intensity source may be a battery, or a vehicle electrical system or a building electrical system. The light source may be connected to a intensity source via control electronics (control circuit); control electronics may comprise one or more switches. The one or more switches may be automated, or controlled by a sensor, timer or other input, or may be controlled by a user, or a combination thereof. For example, a user may operate a switch to turn on a UV light source; the light source may be applied on a constant basis until it is turned off, or it may be pulsed (repeated on/off cycles) until it is turned off. In some embodiments, the light source may be switched from a continuously-on state to a pulsed state, or vice versa. In some embodiments, the light source may be configured to be brightening or darkening over time.

For operation, the light source may be connected to a intensity source capable of providing sufficient intensity to illuminate the sample. Control electronics may be used to switch the intensity on or off based on input from a user or some other input, and can also be used to modulate the intensity to a suitable level (e.g. to control brightness of the output light). Control electronics may be configured to turn the light source on and off as desired. Control electronics may include a switch for manual, automatic, or semi-automatic operation of the light sources. The one or more switches may be, for example, a transistor, a relay or an electromechanical switch. In some embodiments, the control circuit may further comprise an AC-DC and/or a DC-DC converter for converting the voltage from the voltage source to an appropriate voltage for the light source. The control circuit may comprise a DC-DC regulator for regulation of the voltage. The control circuit may further comprise a timer and/or other circuitry elements for applying electric voltage to the optical filter for a fixed period of time following the receipt of input. A switch may be activated manually or automatically in response to predetermined conditions, or with a timer. For example, control electronics may process information such as user input, stored instructions, or the like.

One or more of a plurality of light sources may be provided. In some embodiments, each of the plurality of light sources may be the same. Alternatively, one or more of the light sources may vary. The light characteristics of the light emitted by the light sources may be the same or may vary. A plurality of light sources may or may not be independently controllable. One or more characteristic of the light source may or may not be controlled, including but not limited to whether the light source is on or off, brightness of light source, wavelength of light, intensity of light, angle of illumination, position of light source, or any combination thereof.

In some embodiments, light output from a light source may be from about 350 to about 750 nm, or any amount or range therebetween, for example from about 350 nm to about 360, 370, 380, 390, 400, 410, 420, 430 or about 450 nm, or any amount or range therebetween. In other embodiments, light from a light source may be from about 550 to about 700 nm, or any amount or range therebetween, for example from about 550 to about 560, 570, 580, 590, 600, 610, 620, 630, 640, 650, 660, 670, 680, 690 or about 700 nm, or any amount or range therebetween. In some embodiments, the wavelength of the light generated by the light source can vary, for example, ranging from 400 nm to 800 nm. In some embodiments, the wavelength of the light generated by the light source can be, or be about, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800 nm, or a number or a range between any two of these values. In some embodiments, the wavelength of the light generated by the light source can be at least, or at most, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, or 800 nm. The light source may be capable of emitting electromagnetic waves in any spectrum. In some embodiments, the light source may have a wavelength falling between 10 nm and 100 μm. In some embodiments, the wavelength of light may fall between 100 nm to 5000 nm, 300 nm to 1000 nm, or 400 nm to 800 nm. In some embodiments, the wavelength of light may be less than, and/or equal to 10 nm, 100 nm, 200 nm, 300 nm, 400 nm, 500 nm, 600 nm, 700 nm, 800 nm, 900 nm, 1000 nm, 1100 nm, 1200 nm, 1300 nm, 1500 nm, 1750 nm, 2000 nm, 2500 nm, 3000 nm, 4000 nm, or 5000 nm.

In one example, a light source may be a light-emitting diode (LED) (e.g., gallium arsenide (GaAs) LED, aluminum gallium arsenide (AlGaAs) LED, gallium arsenide phosphide (GaAsP) LED, aluminum gallium indium phosphide (AlGaInP) LED, gallium(III) phosphide (GaP) LED, indium gallium nitride (InGaN)/gallium(III) nitride (GaN) LED, or aluminum gallium phosphide (AlGaP) LED). In another example, a light source can be a laser, for example a vertical cavity surface emitting laser (VCSEL) or other suitable light emitter such as an Indium-Gallium-Aluminum-Phosphide (InGaAlP) laser, a Gallium-Arsenic Phosphide/Gallium Phosphide (GaAsP/GaP) laser, or a Gallium-Aluminum-Arsenide/Gallium-Aluminum-Arsenide (GaAlAs/GaAs) laser. Other examples of light sources may include but are not limited to electron stimulated light sources (e.g., Cathodoluminescence, Electron Stimulated Luminescence (ESL light bulbs), Cathode ray tube (CRT monitor), Nixie tube), incandescent light sources (e.g., Carbon button lamp, Conventional incandescent light bulbs, Halogen lamps, Globar, Nernst lamp), electroluminescent (EL) light sources (e.g., Light-emitting diodes—Organic light-emitting diodes, Polymer light-emitting diodes, Solid-state lighting, LED lamp, Electroluminescent sheets Electroluminescent wires), gas discharge light sources (e.g., Fluorescent lamps, Inductive lighting, Hollow cathode lamp, Neon and argon lamps, Plasma lamps, Xenon flash lamps), or high-intensity discharge light sources (e.g., Carbon arc lamps, Ceramic discharge metal halide lamps, Hydrargyrum medium-arc iodide lamps, Mercury-vapor lamps, Metal halide lamps, Sodium vapor lamps, Xenon arc lamps). Alternatively, a light source may be a bioluminescent, chemiluminescent, phosphorescent, or fluorescent light source.

Optical filters may be tuned in terms of clarity or haze, translucency, transparency or opacity, light transmittance (LT), switching speed, durability, photostability, contrast ratio, state of light transmittance (e.g. dark state or light state). "Light transmittance" (LT) refers to the quantity of light that is transmitted or passes through an optical filter, or device or apparatus comprising same. LT may be expressed with reference to a change in light transmission and/or a particular type of light or wavelength of light (e.g. from about 10% visible light transmission (LT) to about 90% LT, or the like). LT may alternately be expressed as absorbance, and may optionally include reference to one or more wavelengths that are absorbed. According to some embodiments, an optical filter may be selected, or configured to have in one state, a LT of less than 80%, or less than 70%, or less than 60%, or less than 50%, or less than 40%, or less than 30%, or less than 20% or less than 10%, or any amount or range therebetween. According to some embodiments, an optical filter may be selected, or configured to have in another state, a LT of greater than 80%, or greater than 70%, or greater than 60%, or greater than 50%, or greater than 40%, or greater than 30%, or greater than 20% or greater than 10%, or any amount or range therebetween.

A filter can be a bandpass filter and can have peak transmittance of varying wavelength, ranging from 400 nm to 800 nm. In some embodiments, the peak transmittance can be, or be about, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800 nm, or a number or a range between any two of these values. In some embodiments, the peak transmittance can be at least, or at most, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, or 800 nm. The width of the transmission window of a filter can vary, for example, ranging from 1 nm to 50 nm. In some embodiments, the width of the filter can be, or be about, 1, 2, 3, 4, 5, 6, 7, 8, 9, 10, 20, 30, 40, 50 nm, or a number or a range between any two of these values. In some embodiments, the width of the filter can be at least, or at most, 1, 2, 3, 4, 5, 6, 7, 8, 9, 10, 20, 30, 40, or 50 nm. A shortpass filter may be considered a special bandpass filter having the lower limit of the transmission window close to 0 nm. A longpass filter may be considered a special bandpass filter having the upper limit of the transmission window close to infinity. A bandstop filter may be defined as complementary to some bandpass filter.

As used herein, an "optical channel" is a predefined profile of optical frequencies (or equivalently, wavelengths). For example, a first optical channel may have wavelengths of 500 nm-600 nm. To take an image in the first optical channel, one may use a detector which is only responsive to 500 nm-600 nm light, or use a bandpass filter having a transmission window of 500 nm-600 nm to filter the incoming light onto a detector responsive to 300 nm-800 nm light.

A second optical channel may have wavelengths of 300 nm-450 nm and 850 nm-900 nm. To take an image in the second optical channel, one may use a detector responsive to 300 nm-450 nm light and another detector responsive to 850 nm-900 nm light and then combine the detected signals of the two detectors. Alternatively, to take an image in the second optical channel, one may use a bandstop filter which rejects 451 nm-849 nm light in front of a detector responsive to 300 nm-900 nm light.

ADDITIONAL NOTES

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

The various illustrative imaging or data processing techniques described in connection with the embodiments disclosed herein can be implemented as electronic hardware, computer software, or combinations of both. To illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative detection systems described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, systems described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" or "a device to" are intended to include one or more recited devices. Such one or more recited devices can also be collectively configured to carry out the stated recitations. For example, "a processor to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A system for identifying nucleobases in a polynucleotide bound to a substrate, the system comprising:
   a fluidic device;
   a first detector;
   a first light source;
   a processor; wherein
   the fluidic device is configured to deliver a set of nucleotide analogs to the polynucleotide, wherein the set of nucleotide analogs comprises:
      a first nucleotide analog coupled to a first number of a first fluorescent label,
      a second nucleotide analog coupled to a second number of a second fluorescent label, and
      a third nucleotide analog coupled to a third number of a third fluorescent label;
   the first detector is configured to detect light within a first range of detection wavelengths;
   the first light source is configured to output light at a first excitation wavelength; and
   the processor is configured to:
      (i) determine an error rate of identifying a nucleobase in the nucleotide, determine a quality of identifying a nucleobase in the nucleotide or determine a signal-to-noise ratio of light emissions from a plurality of polynucleotides bound to the substrate, or a combination thereof, and
      (ii) control the first light source to generate a first light at the first excitation wavelength to stimulate a first light emission from the polynucleotide bound to the substrate,
      (iii) identify a nucleobase in the polynucleotide based on a first intensity of the first light emission received by the first detector, and
      (iv) control the fluidic device to deliver an alternative set of nucleotide analogs to the polynucleotide, based on the determined quality of identifying the nucleobase, based on the determined error rate of identifying the nucleobase, based on the determined signal-to-noise ratio, or after a predetermined number of cycles of identifying a nucleobase.

2. The system of claim 1, wherein the processor is further configured to identify the nucleobase as a first nucleobase when the first intensity of the first light emission received by the first detector has a first value and as a second nucleobase when the first intensity of the first light emission received by the first detector has a second value wherein the second value is less than the first value and the first value is a full value.

3. The system of claim 1, wherein the first detector is further configured to capture images for identifying at least four different types of nucleobases.

4. The system of claim 1, further comprising a second detector configured to detect light within a second range of detection wavelengths, wherein the processor is further configured to identify the nucleobase in the polynucleotide based on the first intensity of the first light emission received by the first detector and a second intensity of the first light emission received by the second detector.

5. The system of claim 1, further comprising a second light source configured to output light at a second excitation wavelength, wherein the processor is further configured to:
   control the second light source to generate a second light at the second excitation wavelength to stimulate a second light emission from the polynucleotide; and identify an additional nucleobase in the polynucleotide based on a second intensity of the second light emission received by the first detector.

6. The system of claim 1, further comprising:
a second detector configured to detect light within a second range of detection wavelengths; and
a second light source configured to output light at a second excitation wavelength, wherein the processor is further configured to:
control the second light source to generate a second light at the second excitation wavelength to stimulate a second light emission from the polynucleotide; and
identify an additional nucleobase in the polynucleotide based on the first intensity of the first light emission received by the first detector, a second intensity of the second light emission received by the second detector, a third intensity of the first light emission received by the second detector, and a fourth intensity of the second light emission received by the first detector.

7. The system of claim 6, wherein the processor is further configured to, in response to the determined quality, actuate the second detector, the second light source, or both.

8. The system of claim 6, wherein the processor is further configured to, in response to the determined error rate, actuate the second detector, the second light source, or both, and switch from a first mode of nucleobase identification using the first detector to a second mode of nucleobase identification using both the first detector and the second detector.

9. The system of claim 6, wherein the processor is further configured to, in response to the determined signal-to-noise ratio, actuate the second detector, the second light source, or both, and switch from a first mode of nucleobase identification using the first detector to a second mode of nucleobase identification using both the first detector and the second detector.

10. The system of claim 6, wherein the processor is further configured to actuate the second detector, the second light source, or both, after the predetermined number of cycles of identifying a nucleobase in the polynucleotide.

11. The system of claim 6, wherein the processor is further configured to actuate the second detector, the second light source, or both, and switch from a first mode of nucleobase identification using the first detector to a second mode of nucleobase identification using both the first detector and the second detector, after the predetermined number of cycles of identifying a nucleobase in the polynucleotide.

12. The system of claim 1, wherein the set of nucleotide analogs further comprises:
a first population of nucleotide analogs having a first predetermined percentage thereof coupled to a fluorophore;
a second population of nucleotide analogs having a second predetermined percentage thereof coupled to the fluorophore; and
a third population of nucleotide analogs having a third predetermined percentage thereof coupled to the fluorophore.

13. The system of claim 12, wherein the set of nucleotide analogs further comprises:
a fourth population of nucleotide analogs having a fourth predetermined percentage thereof coupled to the fluorophore, or wherein the fourth population of nucleotide analogs is not coupled to the fluorophore.

14. The system of claim 1, wherein the set of nucleotide analogs comprises:
a first nucleotide analog coupled to a first number of a fluorophore;
a second nucleotide analog coupled to a second number of the fluorophore; and
a third nucleotide analog coupled to a third number of the fluorophore.

15. The system of claim 14, wherein the set of nucleotide analogs further comprises:
a fourth nucleotide analog coupled to a fourth number of the fluorophore, or a fourth nucleotide analog not coupled to the fluorophore.

16. The system of claim 1, wherein the set of nucleotide analogs further comprises:
a fourth nucleotide analog coupled to a fourth fluorescent label, or a fourth nucleotide analog not coupled to a fluorescent label.

17. The system of claim 1, wherein the first fluorescent label has a first fluorescent brightness and a first emission spectrum, the second fluorescent label has a second fluorescent brightness and a second emission spectrum and the third fluorescent label has a third fluorescent brightness and a third emission spectrum.

18. The system of claim 1, wherein the set of nucleotide analogs further comprises:
a fourth nucleotide analog coupled to a fourth number of a fourth fluorescent label, or a fourth nucleotide analog not coupled to a fluorescent label.

19. The system of claim 1, wherein the first fluorescent label has a first fluorescent brightness and a first emission spectrum, the second fluorescent label has a second fluorescent brightness and a second emission spectrum and the third fluorescent label has a third fluorescent brightness and a third emission spectrum.

\* \* \* \* \*